United States Patent
Harada

(10) Patent No.: US 9,678,327 B2
(45) Date of Patent: Jun. 13, 2017

(54) ENDOSCOPE OBJECTIVE LENS AND ENDOSCOPE

(71) Applicant: FUJIFILM Corporation, Tokyo (JP)

(72) Inventor: Keisuke Harada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 14/751,159

(22) Filed: Jun. 26, 2015

(65) Prior Publication Data

US 2016/0004064 A1    Jan. 7, 2016

(30) Foreign Application Priority Data

Jul. 2, 2014   (JP) ................................. 2014-136509

(51) Int. Cl.
| | | |
|---|---|---|
| *G02B 9/04* | (2006.01) | |
| *G02B 9/00* | (2006.01) | |
| *G02B 9/08* | (2006.01) | |
| *G02B 23/24* | (2006.01) | |

(52) U.S. Cl.
    CPC .................................. *G02B 23/243* (2013.01)

(58) Field of Classification Search
    CPC ................................................... G02B 23/243
    USPC .......................................... 359/793, 644, 740
    See application file for complete search history.

(56) References Cited

U.S. PATENT DOCUMENTS

| | | |
|---|---|---|
| 2008/0180809 A1 | 7/2008 | Igarashi |
| 2010/0305405 A1 | 12/2010 | Miyano |
| 2014/0015999 A1* | 1/2014 | Miyano .................. G02B 13/06 |
| | | 348/222.1 |

FOREIGN PATENT DOCUMENTS

| | | |
|---|---|---|
| JP | 2008-107391 | 5/2008 |
| JP | 2010-276923 | 12/2010 |

* cited by examiner

*Primary Examiner* — Alicia M Harrington
(74) *Attorney, Agent, or Firm* — Jianq Chyun IP Office

(57) ABSTRACT

An endoscope objective lens consists essentially of, in order from the object side, a negative first lens group, a stop, and a positive second lens group. At least one of the first lens group and the second lens includes only one cemented lens which is formed by a positive lens and a negative lens cemented together. The entire system includes a positive single lens. The endoscope objective lens satisfies given condition expressions relating to the focal length of the entire system, the center thickness of the positive single lens, the center thickness of the cemented lens, the distance from the most object-side lens surface to the stop, and the distance from the stop to the most image-side lens surface.

20 Claims, 22 Drawing Sheets

EXAMPLE 1

FIG.4 EXAMPLE 4

FIG.5 EXAMPLE 5

FIG.11 EXAMPLE 1

EXAMPLE 2

FIG.19 EXAMPLE 9

ENDOSCOPE OBJECTIVE LENS AND ENDOSCOPE

CROSS-REFERENCE TO RELATED APPLICATIONS

The present application claims priority under 35 U.S.C. §119 to Japanese Patent Application No. 2014-136509, filed on Jul. 2, 2014. The above application is hereby expressly incorporated by reference, in its entirety, into the present application.

BACKGROUND

Field of the Disclosure

The present disclosure relates to an endoscope objective lens and an endoscope.

Description of the Related Art

In medical field, endoscopes are conventionally used to perform observation, treatment, etc., in the interior of the body of a patient. As an objective lens for use with endoscopes, those disclosed in Japanese Unexamined Patent Publication Nos. 2008-107391 and 2010-276923 (hereinafter, Patent Documents 1 and 2, respectively), for example, have been proposed. Patent Document 1 teaches an endoscope objective lens formed by, in order from the object side, a negative front group, a positive middle group, and a positive rear group. Patent Document 2 teaches an endoscope objective lens having a four-group five-lens configuration or a four-group six-lens configuration.

SUMMARY

At the distal end portion of the inserted section of an endoscope inserted into the interior of the body of a patient, members such as an illumination section, a surgical tool insertion opening, and an air/water delivering nozzle used to clean the surface of the objective lens, are disposed, besides the objective lens. While such members are disposed at the inserted section, diameter reduction of the inserted section is desired to reduce the burden imposed on the patient when the endoscope is inserted into the interior of the body. To achieve this, further size reduction and diameter reduction of the objective lens are desired. For example, with respect to the objective lenses taught in Patent Documents 1 and 2, further improvement of the entire length of the lens is desired.

In general, to achieve size reduction and diameter reduction of the objective lens, it is necessary to reduce the entire length and the outer diameter of the lens. To this end, one may consider reducing the number of lenses or the center thicknesses of the lenses. However, reducing the number of lenses has a disadvantage that tendency of aberrations, such as field curvature and lateral chromatic aberration, is increased, resulting in degradation of image resolution performance. Reducing the center thickness also reduces the edge thickness, which is the thickness at the outermost peripheral area of the lens, and particular attention is required for positive lenses, whose edge thickness is smaller than the center thickness. A lens having a small diameter and a very small edge thickness, such as one used as an endoscope objective lens, is difficult to be produced by polishing, and there are limitations in controlling the polishing operation. Further, a single lens having a small edge thickness tends to be inclined during assembly, and the inclined lens hinders achieving desired performance. Therefore an appropriate thickness of the lens is necessary to prevent the lens inclination.

In view of the above-described circumstances, the present disclosure is directed to providing an endoscope objective lens with reduced size and diameter having good optical performance, and an endoscope provided with the endoscope objective lens.

A first aspect of the endoscope objective lens of the disclosure consists essentially of, in order from the object side, a first lens group having a negative refractive power, a stop, and a second lens group having a positive refractive power, wherein at least one of the first lens group and the second lens group comprises only one cemented lens which is formed by a positive lens and a negative lens cemented together, the entire system comprises at least one single lens having a positive refractive power, and the condition expressions (1) and (2) below are satisfied:

$$1.0 < f/(Dp-Dc) < 10 \quad (1), \text{ and}$$

$$Lf \times Lr/f^2 < 5.0 \quad (2),$$

where f is a focal length of the entire system, Dp is a center thickness of a lens with the smallest center thickness among the at least one single lens having a positive refractive power, Dc is a center thickness of a cemented lens with the smallest center thickness among the at least one cemented lens, Lf is a distance along the optical axis from the most object-side lens surface to the stop, and Lr is a distance along the optical axis from the stop to the most image-side lens surface.

In the first aspect of the endoscope objective lens of the disclosure, it is preferred that the condition expression (3) below be satisfied:

$$1.6 < \frac{Dp}{Dcp} \cdot \frac{\left(\frac{1}{Rpf} - \frac{1}{Rpr}\right)}{\left(\frac{1}{Rcpf} - \frac{1}{Rcpr}\right)}, \quad (3)$$

where Dp is a center thickness of the lens with the smallest center thickness among the at least one single lens having a positive refractive power, Dcp is a center thickness of the positive lens forming the cemented lens with the smallest center thickness among the at least one cemented lens, Rpf is a paraxial radius of curvature of the object-side surface of the lens with the smallest center thickness among the at least one single lens having a positive refractive power, Rpr is a paraxial radius of curvature of the image-side surface of the lens with the smallest center thickness among the at least one single lens having a positive refractive power, Rcpf is a paraxial radius of curvature of the object-side surface of the positive lens forming the cemented lens with the smallest center thickness among the at least one cemented lens, and Rcpr is a paraxial radius of curvature of the image-side surface of the positive lens forming the cemented lens with the smallest center thickness among the at least one cemented lens.

A second aspect of the endoscope objective lens of the disclosure consists essentially of, in order from the object side, a first lens group having a negative refractive power, a stop, and a second lens group having a positive refractive power, wherein at least one of the first lens group and the second lens group comprises only one cemented lens which is formed by a positive lens and a negative lens cemented together, the entire system comprises at least one single lens having a positive refractive power, and the condition expression (3) below is satisfied:

$$1.6 < \frac{Dp}{Dcp} - \frac{\left(\frac{1}{Rpf} - \frac{1}{Rpr}\right)}{\left(\frac{1}{Rcpf} - \frac{1}{Rcpr}\right)}. \qquad (3)$$

The condition expression (3) to be satisfied by the endoscope objective lens of the second aspect of the disclosure is the same as the condition expression (3) which may preferably be satisfied by the endoscope objective lens of the first aspect of the disclosure, and the explanations of the symbols in the condition expression (3) are not repeated here.

It is preferred that the endoscope objective lens of the second aspect of the disclosure satisfy the condition expression (2) below:

$$Lf \times Lr/f^2 < 5.0 \qquad (2),$$

where f is a focal length of the entire system, Lf is a distance along the optical axis from the most object-side lens surface to the stop, and Lr is a distance along the optical axis from the stop to the most image-side lens surface.

In the endoscope objective lens of the first and second aspects of the disclosure, both the first lens group and the second lens group may comprise the cemented lens. In this case, the first lens group may consist essentially of, in order from the object side, a single lens having a negative refractive power, and a cemented lens formed by two lenses cemented together where one of the two lenses is a positive lens and the other is a negative lens, and the second lens group may consist essentially of, in order from the object side, a single lens having a positive refractive power, and a cemented lens formed by two lenses cemented together where one of the two lenses is a positive lens and the other is a negative lens.

In the endoscope objective lens of the first and second aspects of the disclosure, only the first lens group may comprise the cemented lens. In this case, the first lens group may consist essentially of, in order from the object side, a single lens having a negative refractive power, and a cemented lens formed by two lenses cemented together where one of the two lenses is a positive lens and the other is a negative lens, and the second lens group may consist essentially of, in order from the object side, a single lens having a positive refractive power, and a single lens having a negative refractive power.

In the endoscope objective lens of the first and second aspects of the disclosure, only the second lens group may comprise the cemented lens. In this case, the first lens group may consist essentially of a single lens having a negative refractive power, and the second lens group may consist essentially of, in order from the object side, a single lens having a positive refractive power, and a cemented lens formed by two lenses cemented together where one of the two lenses is a positive lens and the other is a negative lens.

It is preferred that the endoscope objective lens of the first and second aspects of the disclosure satisfy the condition expression (4) below:

$$TL/f < 4.0 \qquad (4),$$

where TL is a distance along the optical axis from the most object-side lens surface to the most image-side lens surface, and f is a focal length of the entire system.

In the endoscope objective lens of the first and second aspects of the disclosure, when the first lens group comprises the cemented lens, it is preferred that the condition expressions (5) and (6) below be satisfied:

$$Nd1p < 1.72 \qquad (5), \text{ and}$$

$$vd1p < 35 \qquad (6),$$

where Nd1p is a refractive index with respect to the d-line of the positive lens forming the cemented lens of the first lens group, and vd1p is an Abbe number with respect to the d-line of the positive lens forming the cemented lens of the first lens group.

In the endoscope objective lens of the first and second aspects of the disclosure, when the second lens group comprises the cemented lens, it is preferred that the condition expression (7) below be satisfied:

$$50 < vd2p \qquad (7),$$

where vd2p is an Abbe number with respect to the d-line of the positive lens forming the cemented lens of the second lens group.

In the endoscope objective lens of the first and second aspects of the disclosure, it is more preferred that the condition expressions (1-1) to (7-1) below be satisfied, in place of the above-described condition expressions (1) to (7), respectively:

$$1.4 < f/(Dp - Dc) < 9.5, \qquad (1\text{-}1)$$

$$0.5 < Lf \times Lr/f^2 < 4.0, \qquad (2\text{-}1)$$

$$1.8 < \frac{Dp}{Dcp} - \frac{\left(\frac{1}{Rpf} - \frac{1}{Rpr}\right)}{\left(\frac{1}{Rcpf} - \frac{1}{Rcpr}\right)} < 10, \qquad (3\text{-}1)$$

$$0.5 < TL/f < 3.5, \qquad (4\text{-}1)$$

$$1.50 < Nd1p < 1.72, \qquad (5\text{-}1)$$

$$15 < vd1p < 34, \qquad (6\text{-}1)$$

$$52 < vd2p. \qquad (7\text{-}1)$$

It should be noted that "essentially" in the expression "consisting/consist essentially of" as used herein means that the endoscope objective lens may include, besides the elements recited above: lenses substantially without any power; optical elements other than lenses, such as a stop and a cover glass; and a lens flange, a lens barrel, etc.

The term "single lens" as used herein means one lens that is not a cemented lens.

The "cemented lens formed by two lenses cemented together where one of the two lenses is a positive lens and the other is a negative lens" may be a cemented lens formed by a positive lens and a negative lens that are cemented together in this order from the object side, or a cemented lens formed by a negative lens and a positive lens that are cemented together in this order from the object side.

The sign (positive or negative) with respect to the refractive power of any lens including an aspheric surface is about the paraxial region. The sign with respect to the radius of curvature is provided such that a positive radius of curvature indicates a surface shape that is convex toward the object side, and a negative radius of curvature indicates a surface shape that is convex toward the image side.

The endoscope of the disclosure comprises the above-described endoscope objective lens of the disclosure.

The endoscope objective lens of the disclosure is a retrofocus lens having a two-group configuration, includes a cemented lens formed by a positive lens and a negative lens cemented together, and a single lens having a positive refractive power, and satisfies the given condition expressions. This configuration allows achieving the size reduction and the diameter reduction, and achieving good optical performance.

The endoscope of the disclosure, which is provided with the endoscope objective lens of the disclosure, can achieve the size reduction and the diameter reduction of the inserted section, and can provide a good image.

DESCRIPTION OF THE PREFERRED EMBODIMENTS

Figure 1:
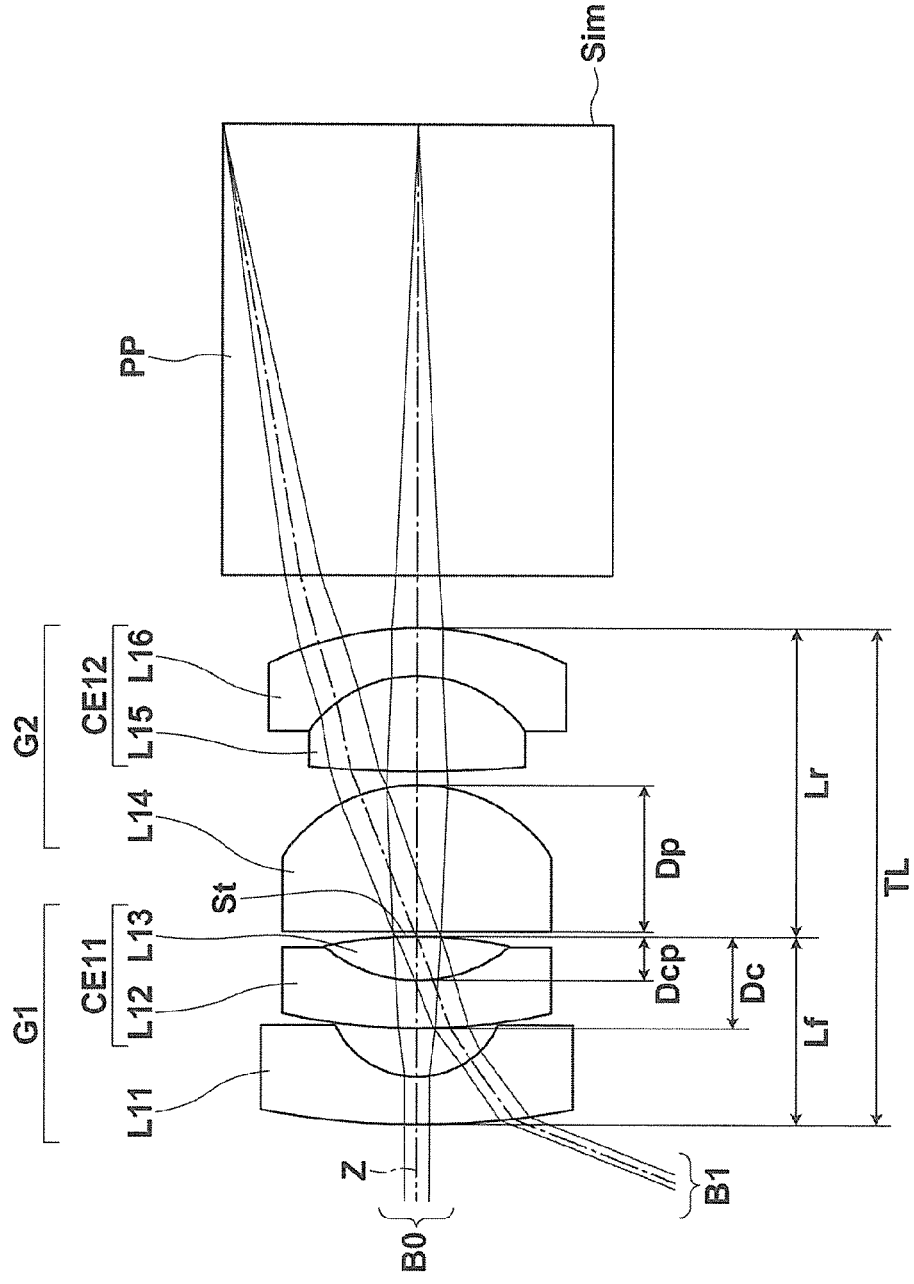
FIG. 1 is a sectional view illustrating the configuration of and optical paths through an endoscope objective lens of Example 1 of the disclosure.

Hereinafter, embodiments of the present disclosure will be described in detail with reference to the drawings.

Each of FIGS. 1 to 10 illustrates the configuration of and optical paths through an endoscope objective lens according to an embodiment of the disclosure in a cross section including the optical axis Z. FIGS. 1 to 10 correspond to lens configurations of Examples 1 to 10, respectively, which will be described later. In FIGS. 1 to 10, the left side is the object side, and the right side is the image side, and the optical paths shown are optical paths of an on-axis bundle of rays B0 and an off-axis bundle of rays B1 at the maximum angle of view from an object at infinity. The examples shown in FIGS. 1 to 10 have the same basic configuration. Therefore the following description is made mainly based on the configuration example shown in FIG. 1, and the configuration examples shown in FIGS. 2 to 10 are described as necessary. It should be noted that FIG. 1 also shows symbols relating to condition expressions, which will be described later, for assisting understanding.

The endoscope objective lens of the disclosure consists essentially of, in order from the object side along the optical axis Z, a first lens group G1 having a negative refractive power, an aperture stop St, and a second lens group G2 having a positive refractive power. At least one of the first lens group G1 and the second lens group G2 of this endoscope objective lens includes only one cemented lens which is formed by a positive lens and a negative lens cemented together, and the entire system includes a single lens having a positive refractive power. The basic configuration of the endoscope objective lens of the disclosure is as described above.

It should be noted that, in the examples shown in FIGS. 1 to 10, an optical member PP with plane-parallel light-entering and light-outgoing surfaces is disposed on the image side of the second lens group G2. However, the optical member PP may be omitted in the disclosure. The optical member PP is assumed to represent an optical path changing prism for bending the optical path, filers, a cover glass, etc. In the case where the optical path changing prism is used, the optical path becomes a bent optical path. However, each of FIGS. 1 to 10 shows an unbent optical path for ease of understanding. While the image-side surface of the optical member PP shown in FIGS. 1 to 10 is in the same position as the image plane Sim, this is not intended to limit the disclosure.

The endoscope objective lens of the disclosure is configured as a retrofocus lens system by including the negative lens group and the positive lens group in this order from the object side, and this optical system can preferably accommodate a wide angle of view which is required for an endoscope. When at least one of the first lens group G1 and the second lens group G2 includes only one cemented lens which is formed by a positive lens and a negative lens cemented together, successful correction of chromatic aberration can be achieved while minimizing the number of lenses to achieve the size reduction. It is preferred that this cemented lens formed by a positive lens and a negative lens cemented together has a positive refractive power as a whole. Further, the entire system includes at least one positive single lens besides the positive lens forming the cemented lens. In order to achieve the size reduction of the lens system, aberrations are corrected using the limited number of lenses. This makes it difficult to distribute the refractive power and to correct field curvature. However, the above-described positive single lens allows correcting the field curvature.

The endoscope objective lens of the disclosure may be configured as any of first to third embodiments described below. In the first embodiment, both the first lens group G1 and the second lens group G2 include the above-described cemented lens. In the second embodiment, only the first lens group G1 includes the above-described cemented lens. In the third embodiment, only the second lens group G2 includes the above-described cemented lens.

As shown in FIGS. 1 to 6, for example, in the endoscope objective lens of the first embodiment, the first lens group G1 may consist essentially of, in order from the object side, a single lens having a negative refractive power, and a cemented lens formed by two lenses cemented together where one of the two lenses is a positive lens and the other is a negative lens, and the second lens group G2 may consist essentially of, in order from the object side, a single lens having a positive refractive power, and a cemented lens formed by two lenses cemented together where one of the two lenses is a positive lens and the other is a negative lens.

Disposing the negative single lens at the most object-side position of the first lens group G1 as described above is advantageous for achieving a wide angle lens system required for an endoscope. The first lens group G1 including the cemented lens formed by a positive lens and a negative lens is advantageous for successfully correcting chromatic aberration. The positive single lens disposed at the most object-side position of the second lens group G2 allows successfully correcting field curvature. The second lens group G2 including the cemented lens formed by a positive lens and a negative lens is advantageous for successfully correcting chromatic aberration. In the first embodiment, the entire system includes the two above-described cemented lenses which are disposed on the object side and the image side of the stop, respectively. This configuration is advantageous for correcting chromatic aberration.

Figure 2:
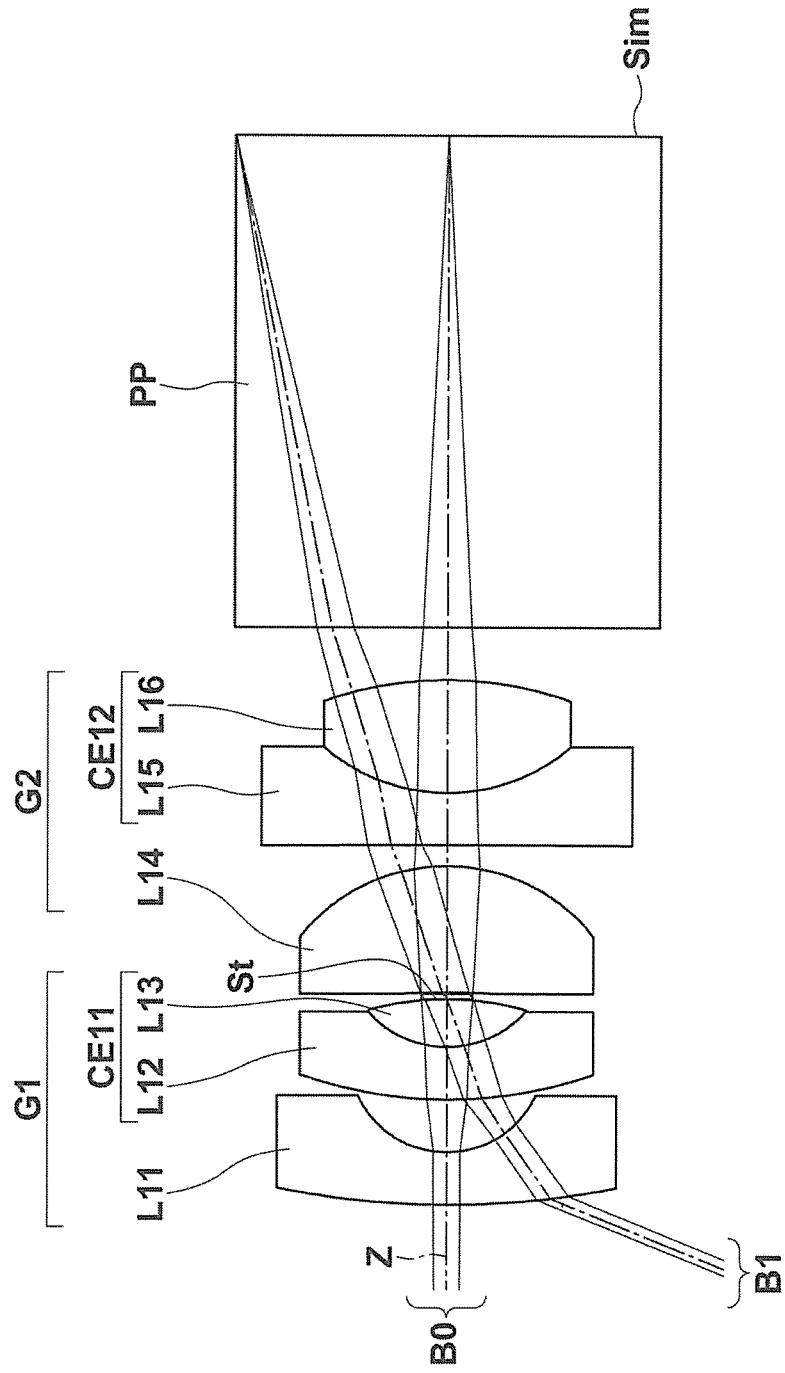
FIG. 2 is a sectional view illustrating the configuration of and optical paths through an endoscope objective lens of Example 2 of the disclosure.
Figure 3:
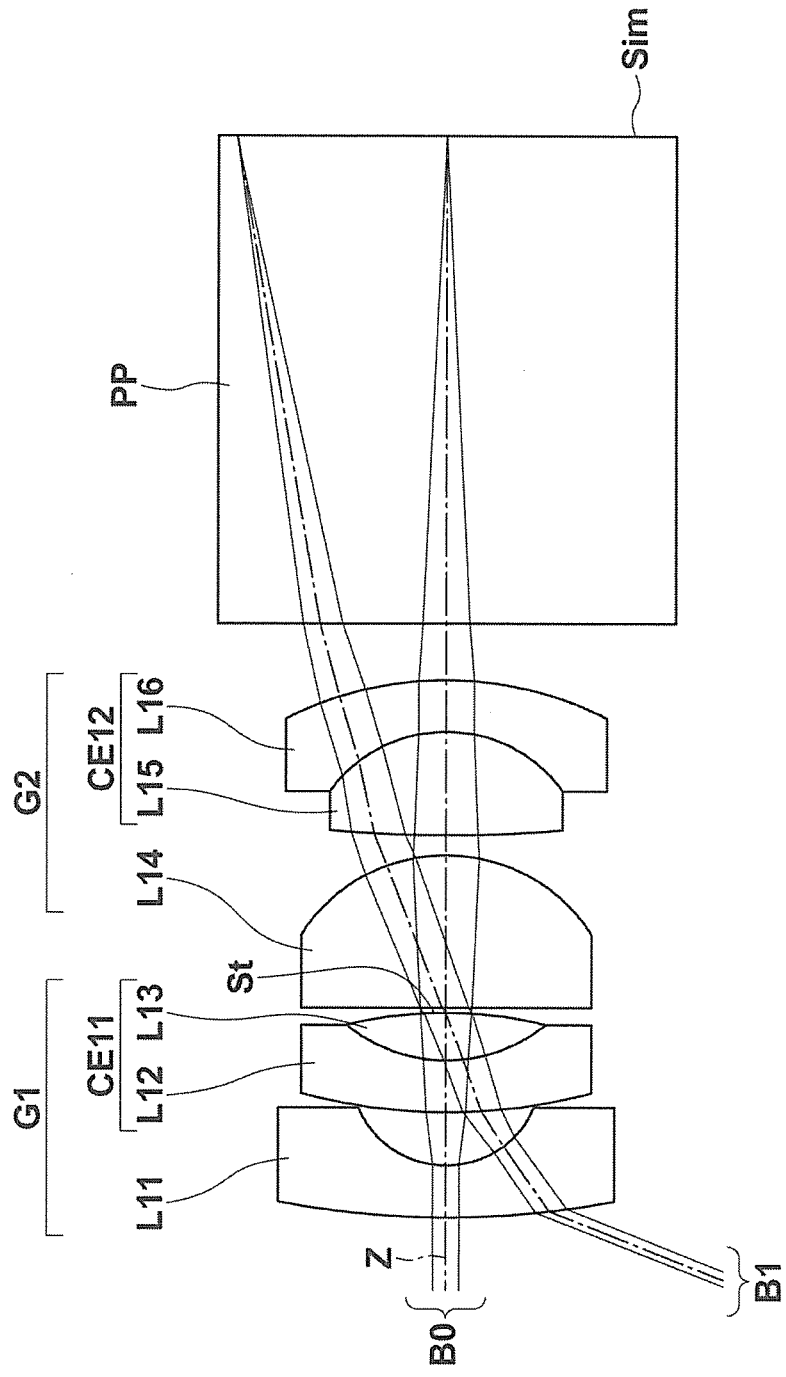
FIG. 3 is a sectional view illustrating the configuration of and optical paths through an endoscope objective lens of Example 3 of the disclosure.
Figure 4:
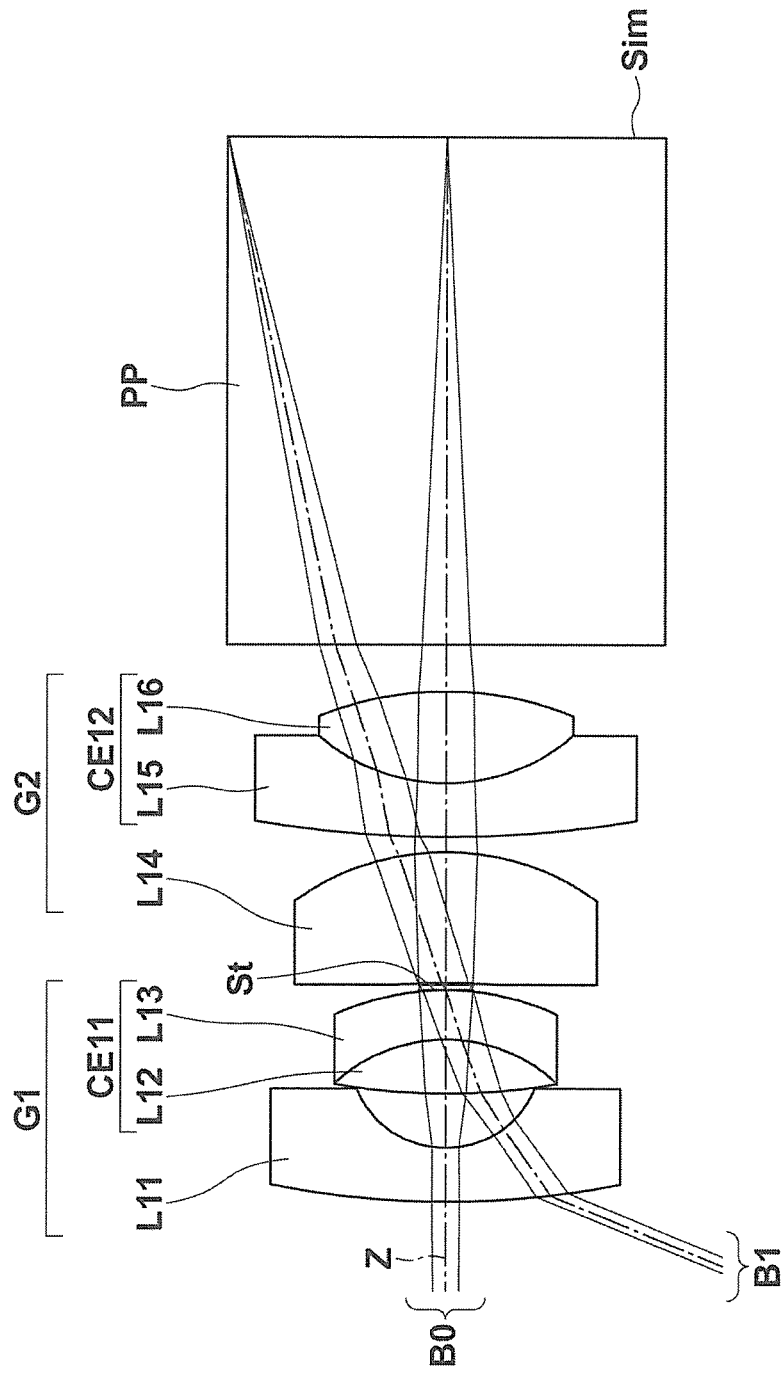
FIG. 4 is a sectional view illustrating the configuration of and optical paths through an endoscope objective lens of Example 4 of the disclosure.
Figure 5:
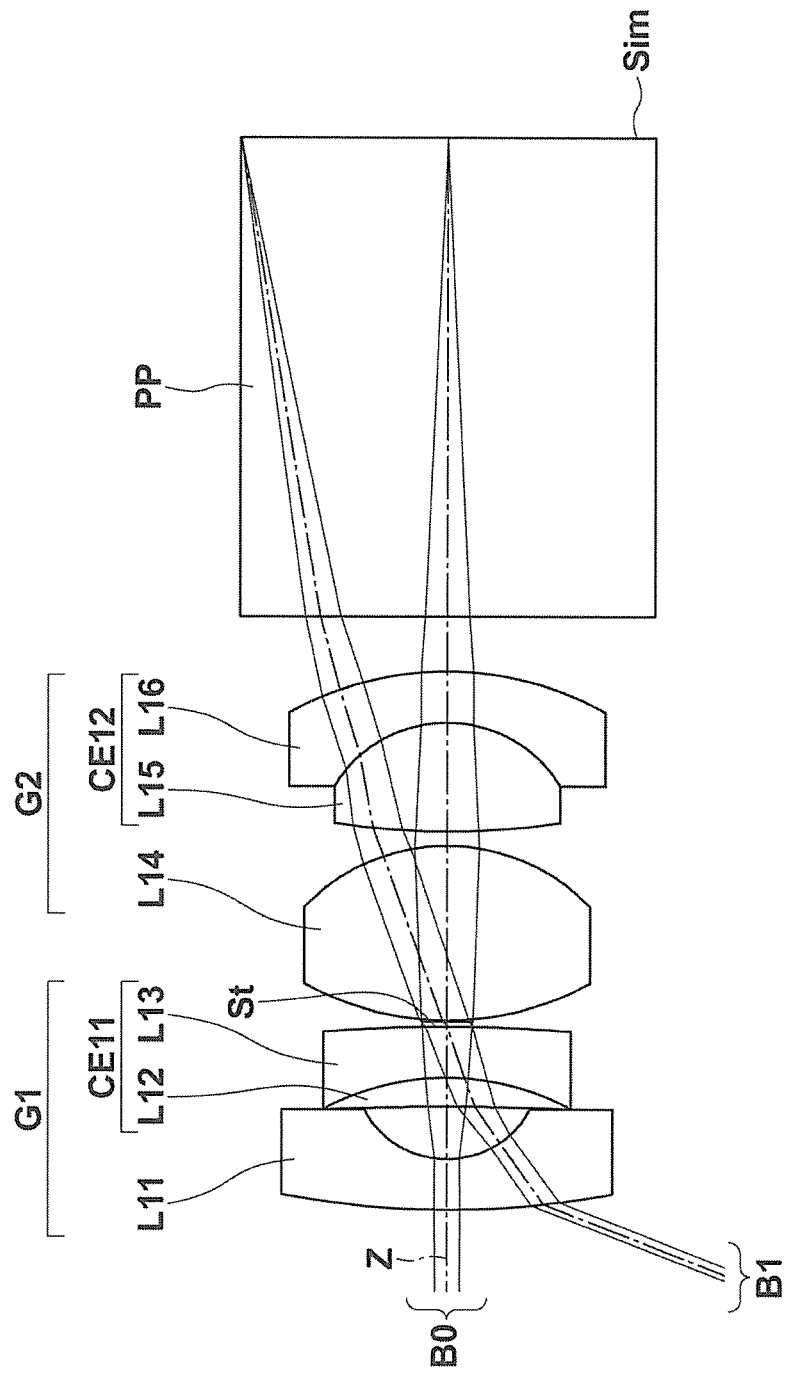
FIG. 5 is a sectional view illustrating the configuration of and optical paths through an endoscope objective lens of Example 5 of the disclosure.
Figure 6:
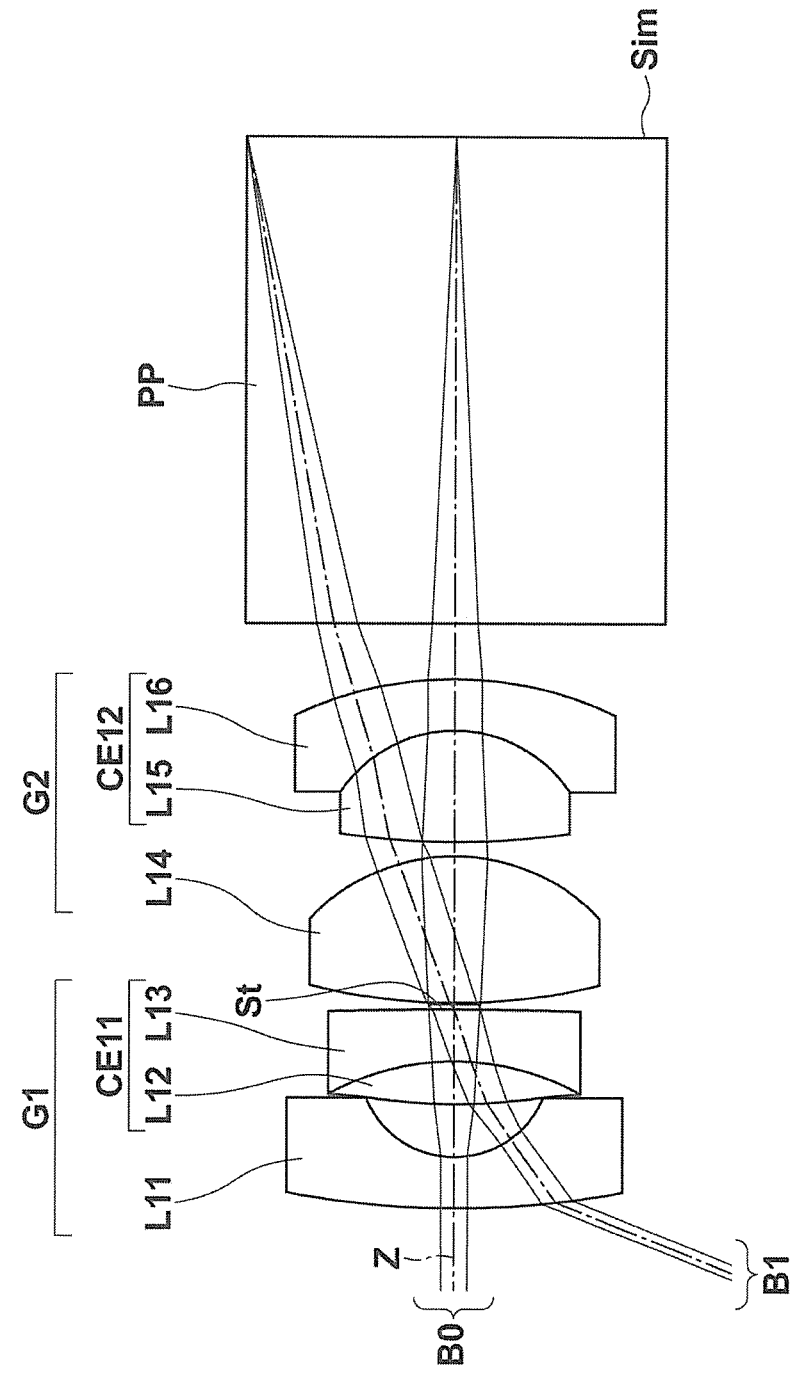
FIG. 6 is a sectional view illustrating the configuration of and optical paths through an endoscope objective lens of Example 6 of the disclosure.

In the examples shown in FIGS. 1 to 6, the first lens group G1 consists of, in order from the object side, a lens L11 which is a negative single lens, and a cemented lens CE11, and the second lens group G2 consists of, in order from the object side, a lens L14 which is a positive single lens, and a cemented lens CE12. The cemented lens CE11 shown in FIGS. 1 to 3 is formed by a negative lens L12 and positive lens L13 which are cemented together in this order from the object side. The cemented lens CE11 shown in FIGS. 4 to 6 is formed by a positive lens L12 and a negative lens L13 which are cemented together in this order from the object side. The cemented lens CE12 shown in FIGS. 1, 3, 5, and 6 is formed by a positive lens L15 and a negative lens L16 which are cemented together in this order from the object side. The cemented lens CE12 shown in FIGS. 2 and 4 is formed by a negative lens L15 and a positive lens L16 which are cemented together in this order from the object side.

Figure 7:
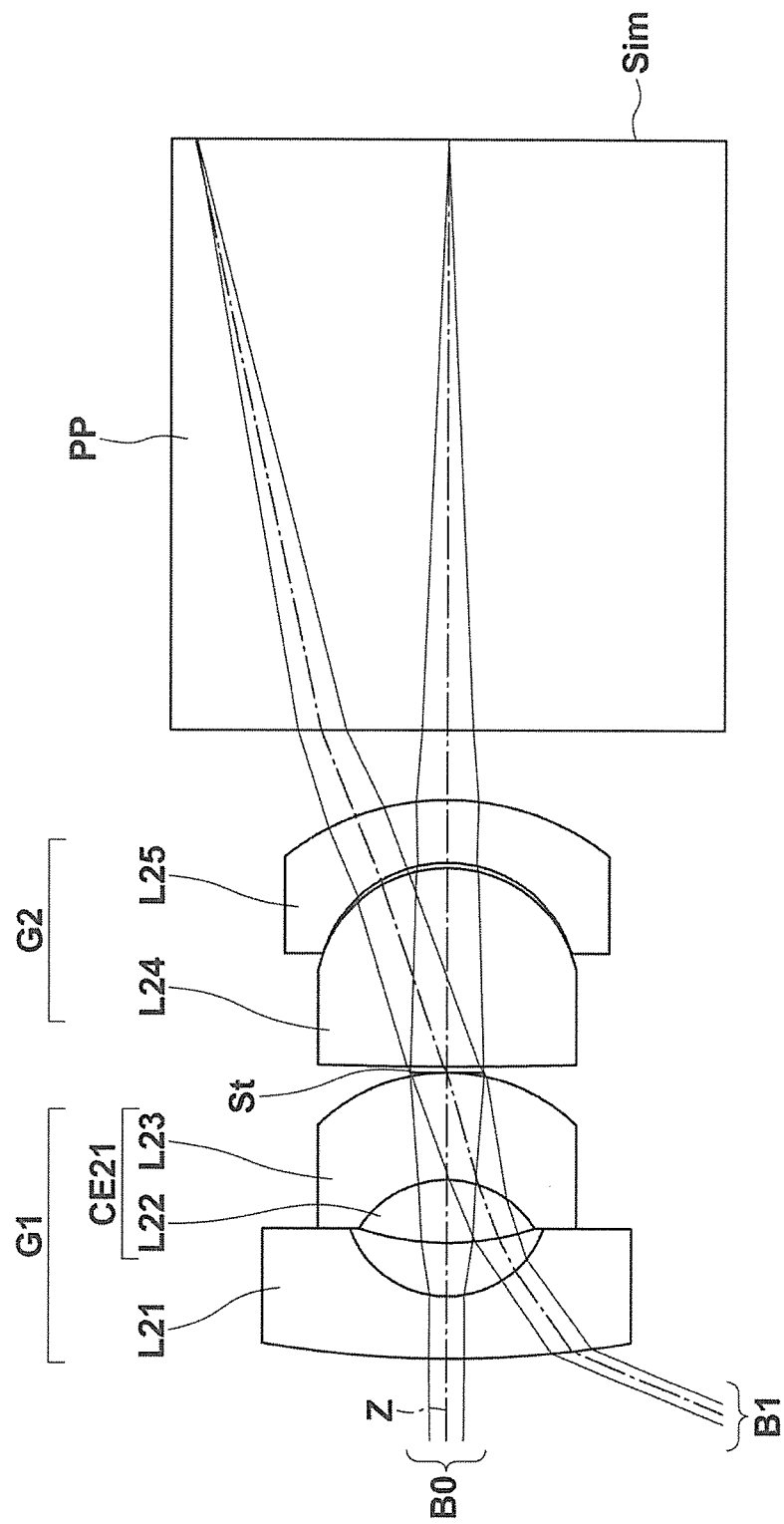
FIG. 7 is a sectional view illustrating the configuration of and optical paths through an endoscope objective lens of Example 7 of the disclosure.
Figure 8:
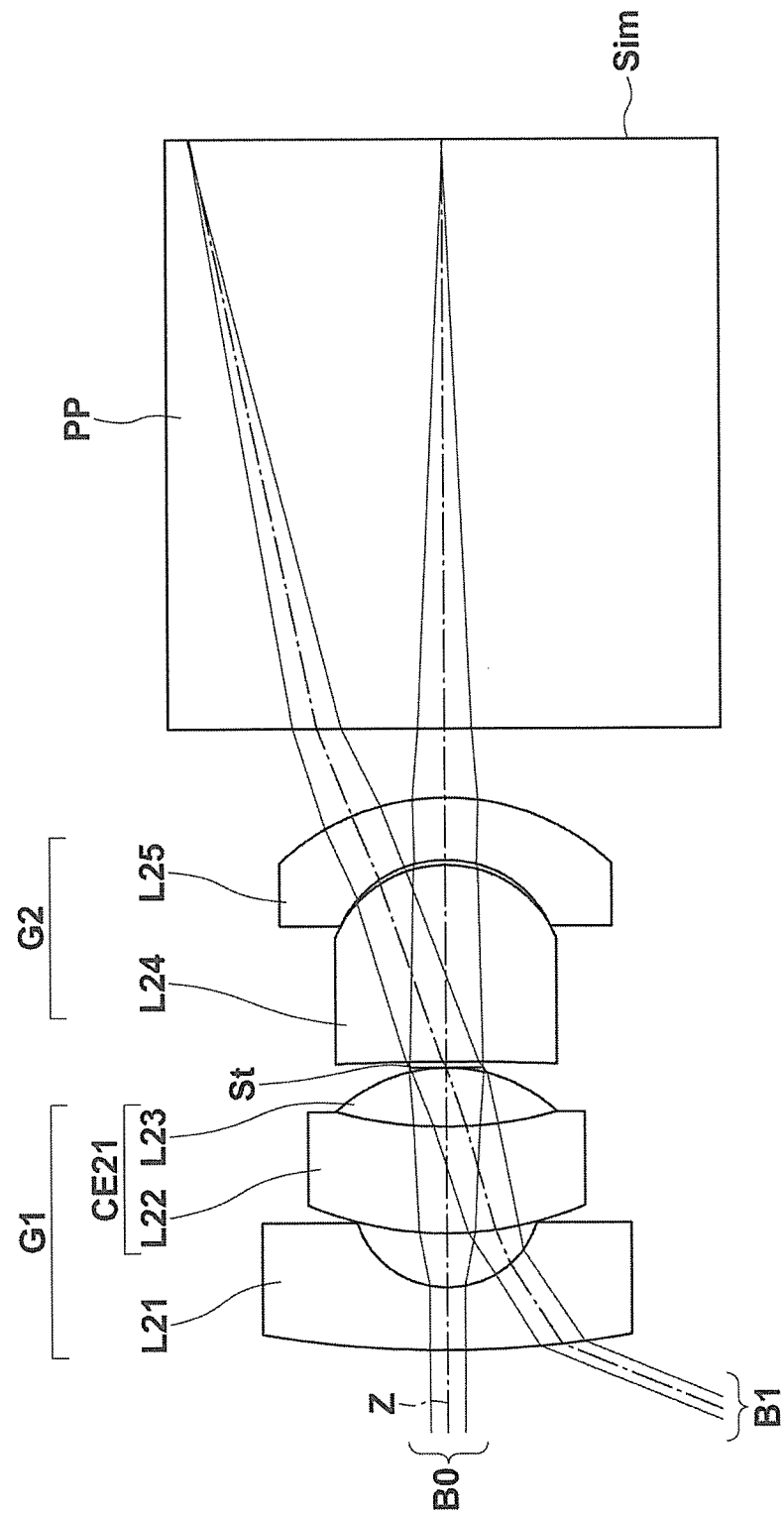
FIG. 8 is a sectional view illustrating the configuration of and optical paths through an endoscope objective lens of Example 8 of the disclosure.

As shown in FIGS. 7 and 8, for example, in the endoscope objective lens of the second embodiment, the first lens group G1 may consist essentially of, in order from the object side, a single lens having a negative refractive power, and a cemented lens formed by two lenses cemented together where one of the two lenses is a positive lens and the other is a negative lens, and the second lens group G2 may consist essentially of, in order from the object side, a single lens having a positive refractive power, and a single lens having a negative refractive power.

Disposing the negative single lens at the most object-side position of the first lens group G1 as described above is advantageous for achieving a wide angle lens system required for an endoscope. The first lens group G1 including the cemented lens formed by a positive lens and a negative lens is advantageous for successfully correcting chromatic aberration. The second lens group G2 including the positive single lens and the negative single lens allows successfully correcting field curvature.

In the examples shown in FIGS. 7 and 8, the first lens group G1 consists of, in order from the object side, a lens L21 which is a negative single lens, and a cemented lens CE21, and the second lens group G2 consists of, in order from the object side, a lens L24 which is a positive single lens, and a lens L25 which is a negative single lens. The cemented lens CE21 shown in FIG. 7 is formed by a positive lens L22 and a negative lens L23 which are cemented together in this order from the object side. The cemented lens CE21 shown in FIG. 8 is formed by a negative lens L22 and a positive lens L23 which are cemented together in this order from the object side.

Figure 9:
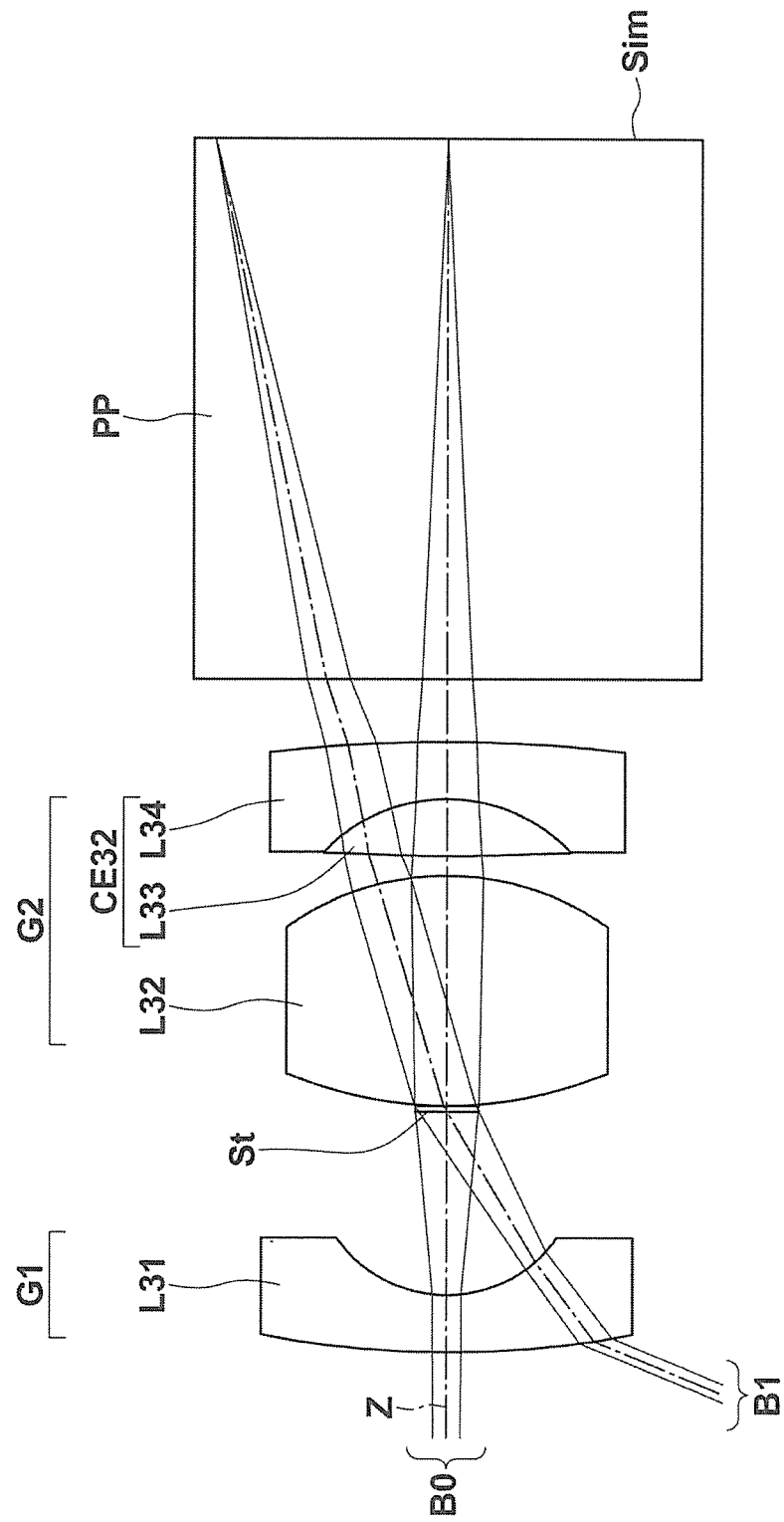
FIG. 9 is a sectional view illustrating the configuration of and optical paths through an endoscope objective lens of Example 9 of the disclosure.
Figure 10:
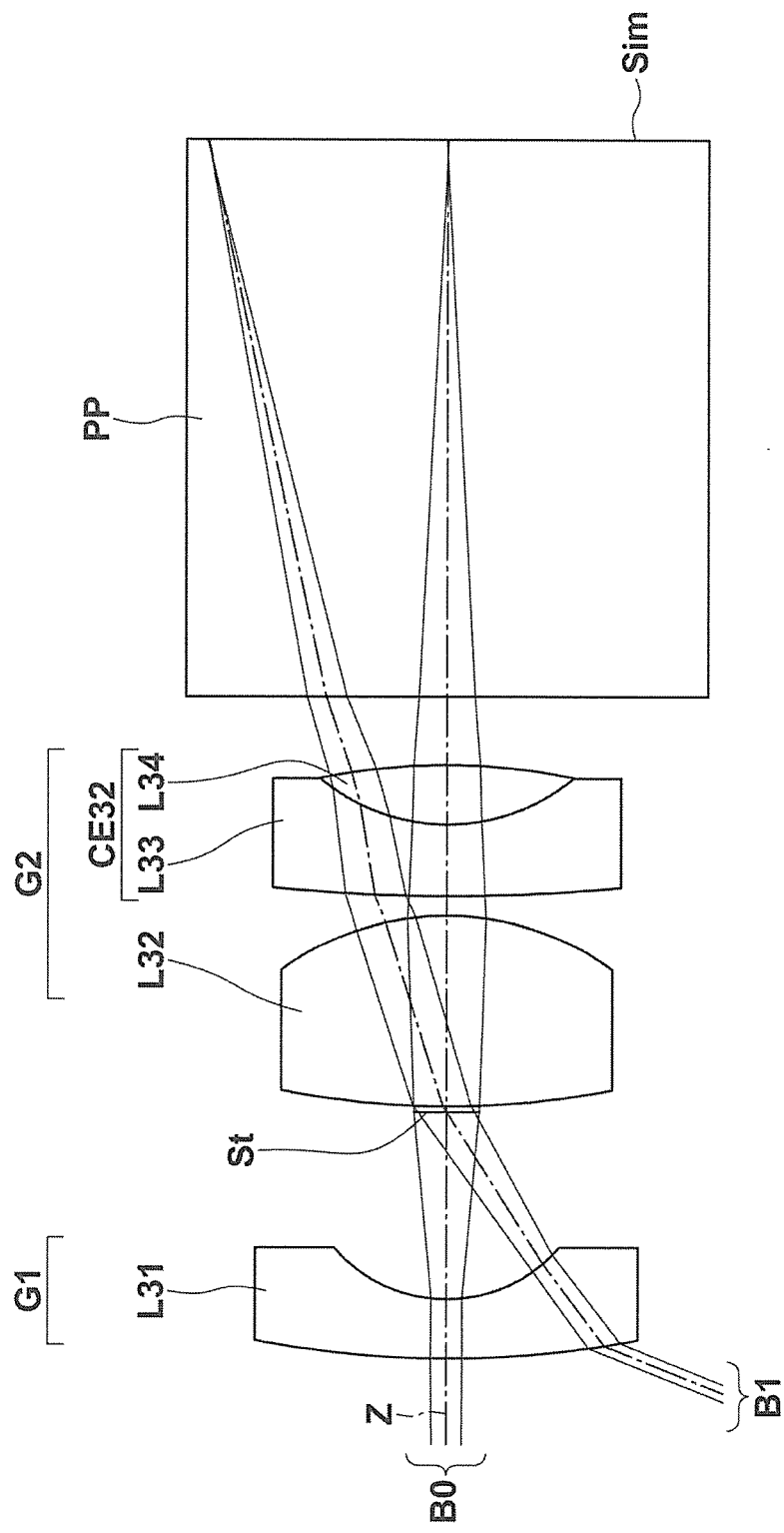
FIG. 10 is a sectional view illustrating the configuration of and optical paths through an endoscope objective lens of Example 10 of the disclosure.

As shown in FIGS. 9 and 10, for example, in the endoscope objective lens of the third embodiment, the first lens group G1 may consist essentially of a single lens having a negative refractive power, and the second lens group G2 may consist essentially of, in order from the object side, a single lens having a positive refractive power, and a cemented lens formed by two lenses cemented together where one of the two lenses is a positive lens and the other is a negative lens.

The first lens group G1 formed by the negative single lens as described above is advantageous for achieving a wide angle lens system required for an endoscope. The positive single lens disposed at the most object-side position of the second lens group G2 allows successfully correcting field curvature. The second lens group G2 including the cemented lens formed by a positive lens and a negative lens is advantageous for successfully correcting chromatic aberration.

In the examples shown in FIGS. 9 and 10, the first lens group G1 consists of a lens L31 which is a negative single lens, and the second lens group G2 consists of, in order from the object side, a lens L32 which is a positive single lens, and a cemented lens CE32. The cemented lens CE32 shown in FIG. 9 is formed by a positive lens L33 and a negative lens L34 which are cemented together in this order from the object side. The cemented lens CE32 shown in FIG. 10 is formed by a negative lens L33 and a positive lens L34 which are cemented together in this order from the object side.

The endoscope objective lens shown in each of FIGS. 1 to 10 achieves the size reduction and the diameter reduction based on the concept of the disclosure descried below. A positive single lens needs to have a certain level of center thickness to ensure the edge thickness; whereas, with respect to a cemented lens formed by two lenses, it is preferred that the center thickness of one of the two lenses be as small as possible when the edge thickness of the other of the two lenses is ensured. With respect to a cemented lens formed by a positive lens and a negative lens, a sufficient edge thickness of the negative lens is usually ensured, and therefore the center thickness of the positive lens is reduced as small as possible. Accordingly, the size reduction and the diameter reduction of the endoscope objective lens can be achieved by configuring the positive single lens to have a center thickness that is sufficient for ensuring the edge thickness, and configuring a cemented lens formed by a positive lens and a negative lens such that the positive lens forming the cemented lens has a sufficiently small center thickness.

It should be noted that the thickness reduction of the positive lens forming the cemented lens can be achieved by using an energy curable resin, for example. Using an energy curable resin, and forming the lens in a state where the resin material is half-cured before the forming facilitates controlling the lens thickness ratio and allows forming the lens with exerting control such that the edge thickness becomes as small as possible. The term "lens thickness ratio" as used herein refers to a ratio between the center thickness and the edge thickness.

Now, condition expressions which may preferably be satisfied by the endoscope objective lens, including condition expressions relating to the center thicknesses of the lenses, are described. It should be noted that the cemented lens relating to the condition expressions (1) to (7) described below refers to the cemented lens formed by a positive lens and a negative lens cemented together.

It is preferred that the endoscope objective lens of each of the first to the third embodiments satisfies any one or any combination of the condition expressions (1) to (4) below:

$$1.0 < f/(Dp - Dc) < 10, \quad (1)$$

$$Lf \times Lr/f^2 < 5.0, \quad (2)$$

$$1.6 < \frac{Dp}{Dcp} \cdot \frac{\left(\frac{1}{Rpf} - \frac{1}{Rpr}\right)}{\left(\frac{1}{Rcpf} - \frac{1}{Rcpr}\right)}, \text{ and} \quad (3)$$

$$TL/f < 4.0, \quad (4)$$

where f is a focal length of the entire system, Dp is a center thickness of a lens with the smallest center thickness among the at least one single lens having a positive refractive power, Dc is a center thickness of a cemented lens with the smallest center thickness among the at least one cemented lens, Lf is a distance along the optical axis from the most object-side lens surface to the stop, Lr is a distance along the optical axis from the stop to the most image-side lens surface, Dcp is a center thickness of the positive lens forming the cemented lens with the smallest center thickness among the at least one cemented lens, Rpf is a paraxial radius of curvature of the object-side surface of the lens with the smallest center thickness among the at least one single lens having a positive refractive power, Rpr is a paraxial radius of curvature of the image-side surface of the lens with the smallest center thickness among the at least one single lens having a positive refractive power, Rcpf is a paraxial radius of curvature of the object-side surface of the positive lens forming the cemented lens with the smallest center thickness among the at least one cemented lens, Rcpr is a paraxial radius of curvature of the image-side surface of the positive lens forming the cemented lens with the smallest center thickness among the at least one cemented lens, and TL is a distance along the optical axis from the most object-side lens surface to the most image-side lens surface.

It is preferred that the endoscope objective lens of each of the first and the second embodiment satisfy the condition expressions (5) and (6) below:

$$Nd1p < 1.72 \quad (5), \text{ and}$$

$$vd1p < 35 \quad (6),$$

where Nd1p is a refractive index with respect to the d-line of the positive lens forming the cemented lens of the first lens group, and
vd1p is an Abbe number with respect to the d-line of the positive lens forming the cemented lens of the first lens group.

It is preferred that the endoscope objective lens of each of the first and the third embodiment satisfy the condition expression (7) below:

$$50 < vd2p \quad (7),$$

where vd2p is an Abbe number with respect to the d-line of the positive lens forming the cemented lens of the second lens group.

Now, effects of the individual condition expressions are described. It should be noted that, in the following description, the lens with the smallest center thickness among the at least one single lens having a positive refractive power is referred to as "thinnest positive single lens", and the cemented lens with the smallest center thickness among the at least one cemented lenses is referred to as "thinnest cemented lens".

Satisfying the lower limit of the condition expression (1) prevents the center thickness of the thinnest positive single lens from becoming excessively large and contributes to the size reduction of the lens system. Reducing the length of the lens system in the optical axis direction allows suppressing the ray height at the most object-side lens and the most image-side lens, which tend to have a large lens outer diameter, and this contributes to diameter reduction of the lens system. Satisfying the upper limit of the condition expression (1) allows preventing the center thickness of the thinnest positive single lens and the center thickness of the thinnest cemented lens from becoming close to each other. This allows ensuring the lens center thickness for ensuring the edge thickness of the thinnest positive single lens to prevent the lens inclination, and allows providing a sufficiently small center thickness of the positive lens forming the thinnest cemented lens to achieve the size reduction and the diameter reduction of the endoscope objective lens.

In order to enhance the effects relating to the condition expression (1), it is preferred that the condition expression (1-1) below be satisfied, and it is more preferred that the condition expression (1-2) below be satisfied:

$$1.4 < f/(Dp-Dc) < 9.5 \quad (1\text{-}1),$$

$$1.7 < f/(Dp-Dc) < 9.0 \quad (1\text{-}2).$$

Satisfying the upper limit of the condition expression (2) allows reducing the entire length of the lens and achieving the size reduction and the diameter reduction. It is more preferred that the condition expression (2-1) below be satisfied. If the values of Lf and Lr become small when the number of lenses is reduced, etc., and the lower limit of the condition expression (2-1) is not satisfied, the refractive power of each lens becomes excessively strong, and this makes it difficult to achieve successful aberration correction. If one of the values of Lf and Lr becomes extremely small and the lower limit of the condition expression (2-1) is not satisfied, symmetry between the portions of the lens system on the object side and the image side of the aperture stop St becomes worse, and this makes it difficult to achieve sufficient aberration correction. Satisfying the lower limit of the condition expression (2-1) allows avoiding the above-described problems. Satisfying the upper limit of the condition expression (2-1) allows enhancing the effects relating to the condition expression (2). In order to further enhance the effects relating to the condition expression (2-1), it is more preferred to satisfy the condition expression (2-2) below.

$$0.5 < Lf \times Lr/f^2 < 4.0 \quad (2\text{-}1),$$

$$1.0 < Lf \times Lr/f^2 < 3.0 \quad (2\text{-}2).$$

Satisfying the lower limit of the condition expression (3) allows ensuring the lens center thickness of the thinnest positive single lens for ensuring the edge thickness of the thinnest positive single lens to thereby prevent the lens inclination, and allows providing a sufficiently small center thickness of the positive lens forming the thinnest cemented lens to achieve the size reduction and the diameter reduction of the endoscope objective lens.

It is more preferred that the condition expression (3-1) below be satisfied. Satisfying the upper limit of the condition expression (3-1) allows preventing the center thickness of the thinnest positive single lens from becoming excessively large and contributes to the size reduction, and allows ensuring the thickness of the positive lens forming the thinnest cemented lens to provide a chromatic aberration correction effect. The effects relating to the condition expression (3) can be enhanced by satisfying the lower limit of the condition expression (3-1). In order to further enhance the effects relating to the condition expression (3-1), it is more preferred to satisfy the condition expression (3-2) below.

$$1.8 < \frac{Dp}{Dcp} \cdot \frac{\left(\frac{1}{Rpf} - \frac{1}{Rpr}\right)}{\left(\frac{1}{Rcpf} - \frac{1}{Rcpr}\right)} < 10, \quad (3\text{-}1)$$

$$2.0 < \frac{Dp}{Dcp} \cdot \frac{\left(\frac{1}{Rpf} - \frac{1}{Rpr}\right)}{\left(\frac{1}{Rcpf} - \frac{1}{Rcpr}\right)} < 5.0. \quad (3\text{-}2)$$

Satisfying the upper limit of the condition expression (4) allows reducing the entire length of the lens and achieving the size reduction and the diameter reduction. It is more preferred that the condition expression (4-1) below be satisfied. Satisfying the lower limit of the condition expression (4-1) allows a configuration with the number of lenses necessary to obtain desired performance, and it is not necessary to provide the individual lenses with an extremely strong refractive power, thereby allowing successful correction of aberrations, such as field curvature. The effects relating to the condition expression (4) can be enhanced by satisfying the upper limit of the condition expression (4-1). In order to further enhance the effects relating to the condition expression (4-1), it is more preferred to satisfy the condition expression (4-2) below.

$$0.5 < TL/f < 3.5 \quad (4\text{-}1),$$

$$1.0 < TL/f < 3.0 \quad (4\text{-}2).$$

Satisfying the upper limit of the condition expression (5) allows using an appropriate material among existing optical materials to achieve successful correction of aberrations, in particular, chromatic aberration. It is more preferred that the condition expression (5-1) below be satisfied. Satisfying the lower limit of the condition expression (5-1) allows ensuring an appropriate power without reducing the absolute value of the radius of curvature of the lens surface of the positive lens forming the cemented lens of the first lens group G1, and this contributes to the size reduction. If the absolute value of the radius of curvature of the lens surface is reduced, it is necessary to increase the center thickness to ensure the edge thickness, which is disadvantageous for the size reduction. In order to enhance the effects relating to the lower limit of the condition expression (5-1), it is more preferred to satisfy the condition expression (5-2) below.

$$1.50 < Nd1p < 1.72 \quad (5\text{-}1),$$

$$1.60 < Nd1p < 1.72 \quad (5\text{-}2).$$

Satisfying the upper limit of the condition expression (6) facilitates successfully correcting longitudinal chromatic aberration, and allows well-balanced correction of lateral chromatic aberration and longitudinal chromatic aberration. It is more preferred that the condition expression (6-1) below be satisfied. Satisfying the lower limit of the condition expression (6-1) allows preventing dispersion of rays from becoming excessively large to allow successful correction of chromatic aberration. The effects relating to the condition expression (6) can be enhanced by satisfying the upper limit of the condition expression (6-1). In order to further enhance the effects relating to the condition expression (6-1), it is more preferred to satisfy the condition expression (6-2) below.

$$15 < vd1p < 34 \quad (6\text{-}1),$$

$$20 < vd1p < 33 \quad (6\text{-}2).$$

Satisfying the lower limit of the condition expression (7) allows successful correction of chromatic aberration, in particular, sufficient correction of lateral chromatic aberration. This allows suppressing chromatic blur, etc., during endoscopic observation. In order to enhance the effects relating to the condition expression (7), it is preferred to satisfy the condition expression (7-1) below, and it is more preferred to satisfy the condition expression (7-2) below:

$$52 < vd2p \quad (7\text{-}1),$$

$$55 < vd2p \quad (7\text{-}2).$$

It is preferred that the cemented lens of the first lens group G1 as a whole have a positive refractive power. This facilitates selecting materials that satisfy the condition expressions (5), (5-1), (5-2), (6), (6-1), and (6-2). That is, the cemented lens of the first lens group G1 having a positive refractive power as a whole is advantageous for correcting chromatic aberration. Also, it is preferred that the cemented lens of the second lens group G2 as a whole have a positive refractive power. This facilitates selecting materials that satisfy the condition expressions (7), (7-1), and (7-2). That is, the cemented lens of the second lens group G2 having a positive refractive power as a whole is advantageous for correcting chromatic aberration.

It is preferred that the above-described preferred and possible configurations including the configurations relating to the condition expressions be selected appropriate depending on the requirements for the endoscope objective lens. Now, two aspects are described below as preferred examples.

The first aspect has the above-described basic configuration and satisfies the condition expressions (1) and (2). The second aspect has the above-described basic configuration and satisfies the condition expression (3). It should be noted that the first aspect may also include features that satisfy the condition expressions other than the condition expressions (1) and (2) or other possible features, and the second aspect may also include features that satisfy the condition expressions other than the condition expression (3) or other possible features.

In a case where the endoscope objective lens is mounted on an endoscope without a protective member, the most object-side lens of the endoscope objective lens is exposed to body fluids, a cleaning fluid, fat and oil, etc. Therefore, it is preferred to form the most object-side lens by using a material that has high water resistance, high acid resistance, high chemical resistance, etc.

Next, Examples 1 to 10 of the endoscope objective lens of the disclosure are described. Examples 1 to 6 described below corresponds to the first embodiment, Examples 7 and 8 corresponds to the second embodiment, and Examples 9 and 10 corresponds to the third embodiment. It should be noted that the numerical values shown in data and aberration diagrams of Examples 1 to 10 described below are normalized such that the focal length of the entire system is "1".

Example 1

The lens configuration of and optical paths through an endoscope objective lens of Example 1 are as shown in FIG. 1, and the manner of illustration is as described above. Therefore the same explanations are not repeated here. Tables 1 and 2 show basic lens data and specifications of the endoscope objective lens of Example 1, respectively. In the table of basic lens data, each value in the column of "Si" represents the surface number of the i-th (i=1, 2, 3, . . . ) surface, where the object-side surface of the most object-side element is the 1st surface and the number is sequentially increased toward the image side; each value in the column of "Ri" represents the radius of curvature of the i-th surface; each value in the column of "Di" represents the surface distance between the i-th surface and the i+1-th surface along the optical axis Z; each value in the column of "Ndj" represents the refractive index with respect to the d-line (the wavelength of 587.56 nm) of the j-th (j=1, 2, 3, . . . ) optical element, where the most object-side optical element is the 1st element and the number is sequentially increased toward the image side; and each value in the column of "vdj" represents the Abbe number with respect to the d-line of the j-th element.

The sign with respect to the radius of curvature is provided such that a positive radius of curvature indicates a surface shape that is convex toward the object side, and a negative radius of curvature indicates a surface shape that is convex toward the image side. The value shown at the lowermost position of the column of surface distance is the surface distance between the most image-side surface and the image plane along the optical axis Z. The basic lens data also shows data of the aperture stop St and the optical member PP, and the text "(St)" is shown together with the surface number of the surface corresponding to the aperture stop St. The values of basic lens data shown in Table 1 are those when the object distance (a distance along the optical axis from the object-side surface of the most object-side lens to the object) is 9.62.

The table of specifications shows the values of focal length f, back focus Bf, F-number FNo., and total angle of view 2ω (the unit is degrees). The values shown in the table of specifications are with respect to the d-line. It should be noted that the values shown in the tables below are rounded at predetermined decimal places.

TABLE 1

Example 1 - Lens Data

| Si | Ri | Di | Ndj | vdj |
|---|---|---|---|---|
| 1 | 4.5029 | 0.2807 | 1.88300 | 40.81 |
| 2 | 0.5016 | 0.2862 | | |
| 3 | 3.3591 | 0.2807 | 1.77849 | 50.15 |
| 4 | 0.8021 | 0.2567 | 1.68893 | 30.79 |
| 5 | −2.4179 | 0.0000 | | |
| 6(St) | ∞ | 0.0281 | | |
| 7 | ∞ | 0.8590 | 1.60875 | 45.54 |
| 8 | −0.8970 | 0.0802 | | |
| 9 | 6.6283 | 0.5615 | 1.58458 | 66.99 |
| 10 | −0.7392 | 0.2807 | 1.91735 | 21.08 |
| 11 | −1.8005 | 0.3063 | | |
| 12 | ∞ | 2.6469 | 1.55920 | 53.92 |
| 13 | ∞ | 0.0000 | | |

TABLE 2

Example 1 - Specifications

| | |
|---|---|
| f | 1.00 |
| Bf | 1.90 |
| FNo. | 6.89 |
| 2ω[°] | 135.4 |

Figure 11:
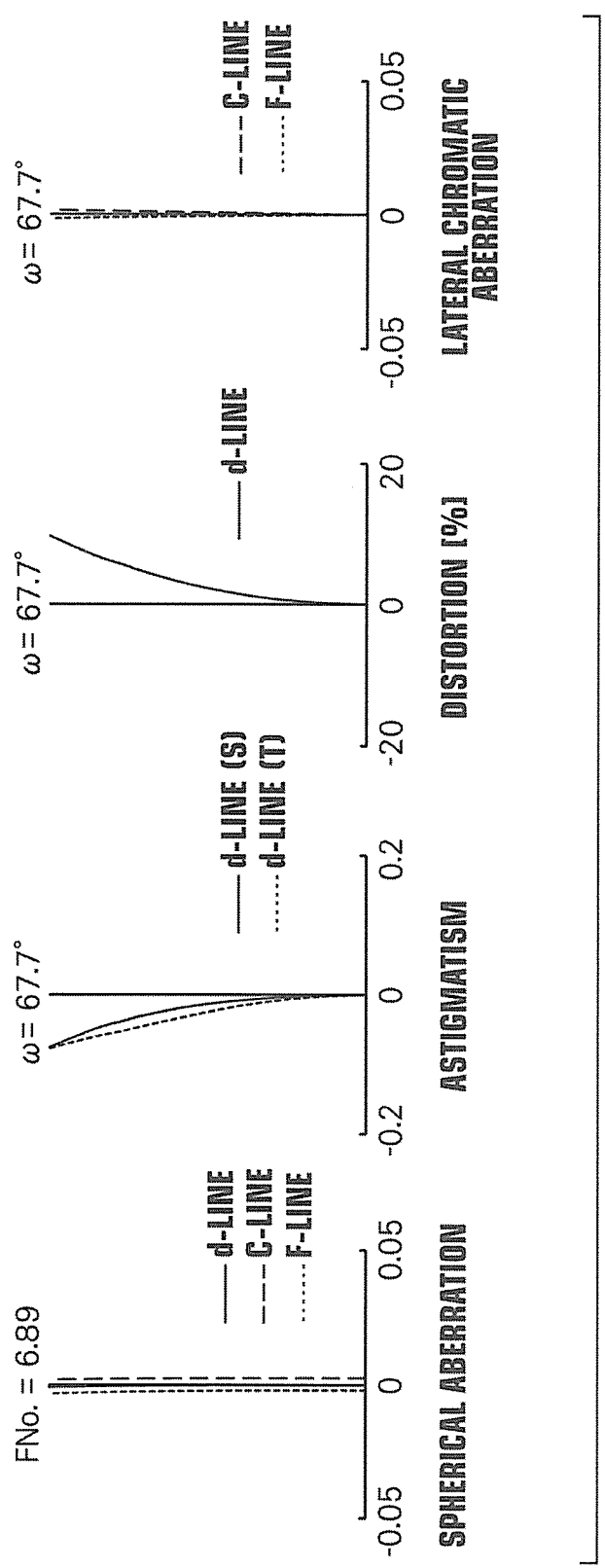
FIG. 11 shows aberration diagrams of the endoscope objective lens of Example 1 of the disclosure, showing spherical aberration, astigmatism, distortion, and lateral chromatic aberration in this order from the left side of the drawing.

FIG. 11 shows aberration diagrams of the endoscope objective lens of Example 1. The aberration diagrams shown in FIG. 11 are those of spherical aberration, astigmatism, distortion, and lateral chromatic aberration (magnification chromatic aberration) in this order from the left of the drawing. The aberration diagram of spherical aberration shows those with respect to the d-line, the C-line (the wavelength of 656.3 nm), and the F-line (the wavelength of 486.1 nm) in the black solid line, the long dashed line, and the short dashed line, respectively. The aberration diagram of astigmatism shows those with respect to the d-line in the sagittal direction and the tangential direction in the solid line and the short dashed line, respectively. The aberration diagram of distortion shows that with respect to the d-line in the solid line. The aberration diagram of lateral chromatic aberration shows those with respect to the C-line and the F-line in the long dashed line and the short dashed line, respectively. The "FNo." in the aberration diagram of spherical aberration means F-number, and the "ω" in the other aberration diagrams means a half value of the total angle of view (half angle of view). The aberration diagrams shown in FIG. 11 are those when the object distance is 9.62.

The above-described manners of illustration in the drawings and symbols, meanings and manners of description of the various data of Example 1 apply also to the examples described below, unless otherwise noted, and the same explanations are not repeated in the following description.

Example 2

Figure 12:
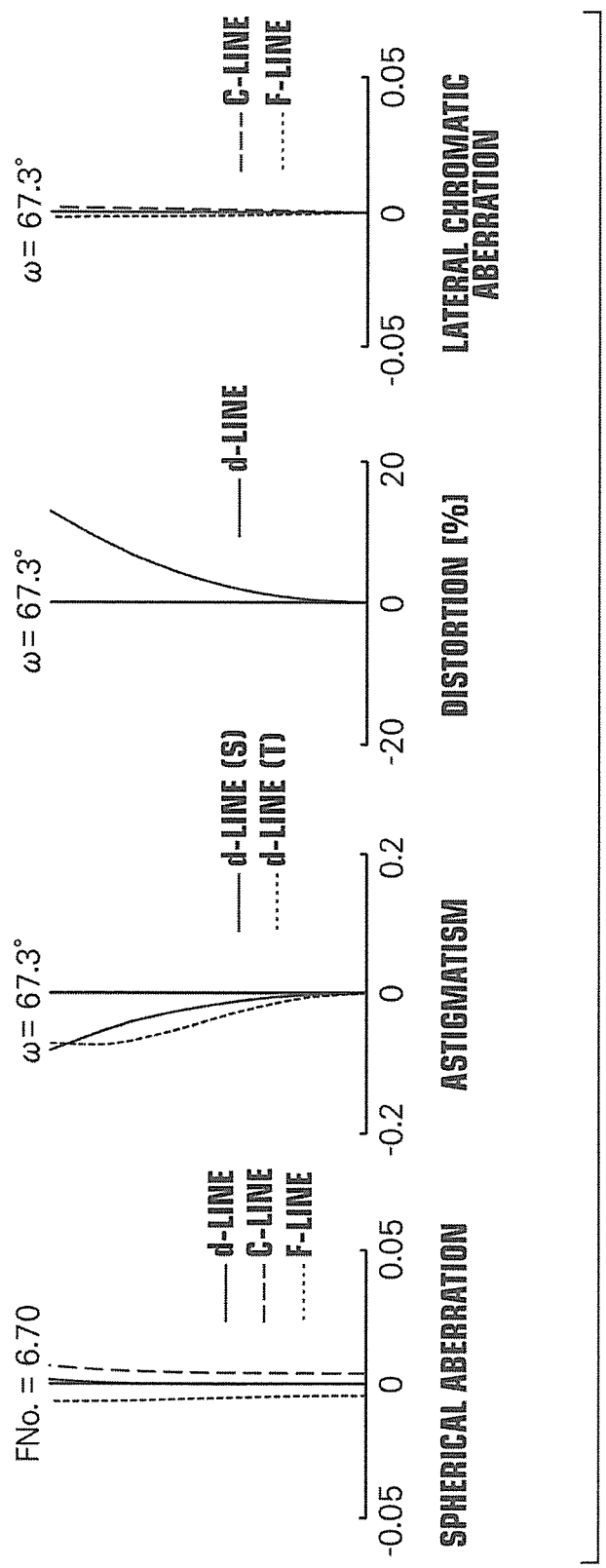
FIG. 12 shows aberration diagrams of the endoscope objective lens of Example 2 of the disclosure, showing spherical aberration, astigmatism, distortion, and lateral chromatic aberration in this order from the left side of the drawing.

The lens configuration of the endoscope objective lens of Example 2 is shown in FIG. 2. Tables 3 and 4 show basic lens data and specifications of the endoscope objective lens of Example 2, respectively. FIG. 12 shows aberration diagrams of the endoscope objective lens of Example 2. The values of the basic lens data and the aberration diagrams of Example 2 are those when the object distance is 9.86.

Example 3

Figure 13:
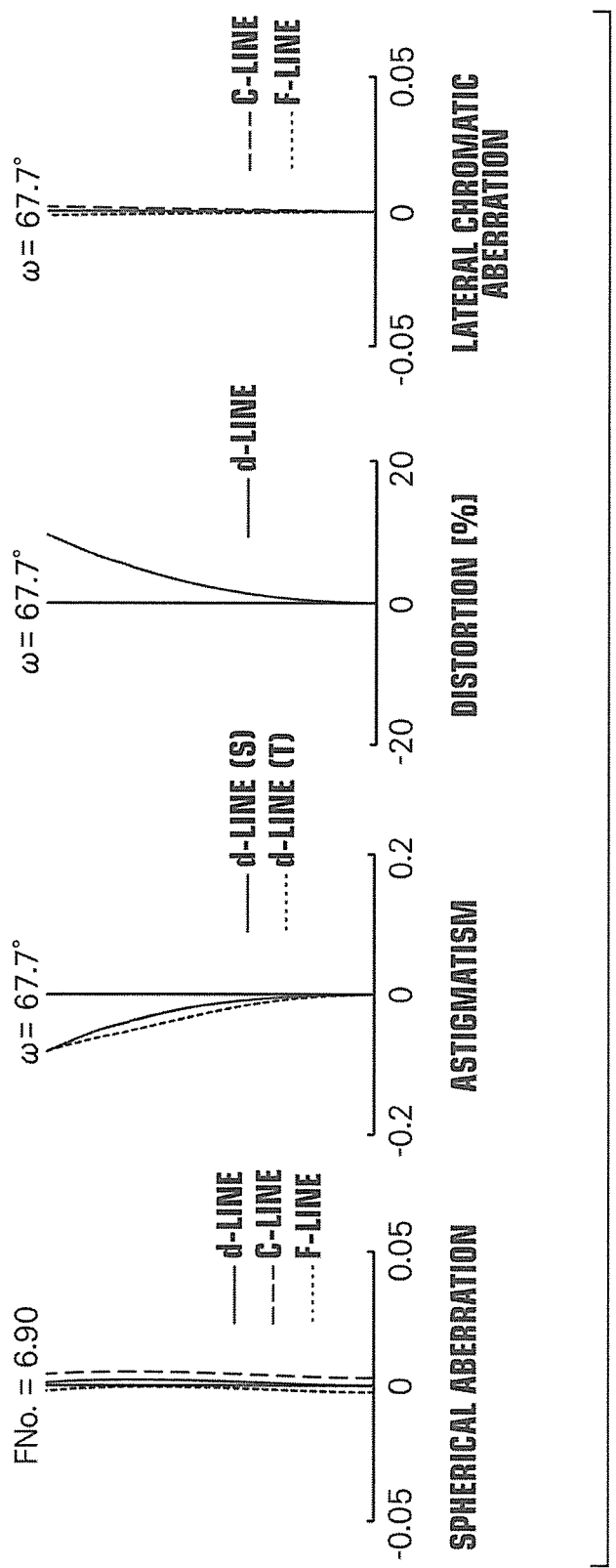
FIG. 13 shows aberration diagrams of the endoscope objective lens of Example 3 of the disclosure, showing spherical aberration, astigmatism, distortion, and lateral chromatic aberration in this order from the left side of the drawing.

The lens configuration of the endoscope objective lens of Example 3 is shown in FIG. 3. Tables 5 and 6 show basic lens data and specifications of the endoscope objective lens of Example 3, respectively. FIG. 13 shows aberration diagrams of the endoscope objective lens of Example 3. The values of the basic lens data and the aberration diagrams of Example 3 are those when the object distance is 9.60. In the basic lens data shown in Table 5, "*" is added to the surface number of each aspheric surface, and a numerical value of the paraxial radius of curvature is shown as the radius of curvature of each aspheric surface. Table 7 shows aspheric coefficients of each aspheric surface. In Table 7, the symbol "E-n" (where n is an integer) following the numerical value of each aspheric coefficient means "×10$^{-n}$". The aspheric coefficients are coefficients KA and Am (where m=3, 4, 5, . . . ) in the formula of aspheric surface shown below. The above-explained manner of description of the aspheric surface also applies to the following examples.

$$Zd = \frac{C \times h^2}{1 + \sqrt{1 - KA \times C^2 \times h^2}} + \sum_m Am \times h^m$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis to the lens surface), C is a paraxial radius of curvature, and KA and Am are aspheric coefficients (where m=3, 4, 5, . . . ).

TABLE 3

Example 2 - Lens Data

| Si | Ri | Di | Ndj | vdj |
|---|---|---|---|---|
| 1 | 4.6114 | 0.2875 | 1.88300 | 40.80 |
| 2 | 0.5109 | 0.2931 | | |
| 3 | 2.2988 | 0.2875 | 1.92001 | 36.00 |
| 4 | 0.5476 | 0.2629 | 1.68822 | 30.84 |
| 5 | −1.5234 | 0.0000 | | |
| 6(St) | ∞ | 0.0369 | | |
| 7 | −3.8029 | 0.6982 | 1.86375 | 24.96 |
| 8 | −0.9771 | 0.1163 | | |
| 9 | −158.0477 | 0.2875 | 1.92001 | 19.00 |
| 10 | 0.9838 | 0.6161 | 1.68494 | 57.25 |
| 11 | −1.9331 | 0.2909 | | |
| 12 | ∞ | 2.7107 | 1.55920 | 53.90 |
| 13 | ∞ | 0.0000 | | |

TABLE 4

Example 2 - Specifications

| | |
|---|---|
| f | 1.00 |
| Bf | 1.93 |
| FNo. | 6.70 |
| 2ω[°] | 134.6 |

TABLE 5

Example 3 - Lens Data

| Si | Ri | Di | Ndj | vdj |
|---|---|---|---|---|
| 1 | 4.4998 | 0.2805 | 1.88300 | 40.81 |
| 2 | 0.4957 | 0.2860 | | |
| 3 | 2.8240 | 0.2805 | 1.84909 | 43.09 |
| 4 | 0.8015 | 0.2565 | 1.68416 | 31.13 |
| *5 | −2.3234 | 0.0000 | | |
| 6(St) | ∞ | 0.0281 | | |
| 7 | ∞ | 0.8323 | 1.61238 | 37.63 |
| 8 | −0.8854 | 0.1093 | | |
| 9 | 6.6238 | 0.5611 | 1.58939 | 66.25 |
| 10 | −0.7403 | 0.2805 | 1.91379 | 19.74 |
| 11 | −1.8078 | 0.3049 | | |
| 12 | ∞ | 2.6451 | 1.55920 | 53.92 |
| 13 | ∞ | 0.0000 | | |

TABLE 6

Example 3 - Specifications

| | |
|---|---|
| f | 1.00 |
| Bf | 1.90 |
| FNo. | 6.90 |
| 2ω[°] | 135.4 |

TABLE 7

Example 3 - Aspheric Coefficients

| Surface No. | 5 |
|---|---|
| KA | 1.0000000E+00 |
| A3 | 0.0000000E+00 |
| A4 | 6.5965567E−02 |
| A5 | −5.4798577E−01 |
| A6 | 6.1846279E−01 |

Example 4

Figure 14:
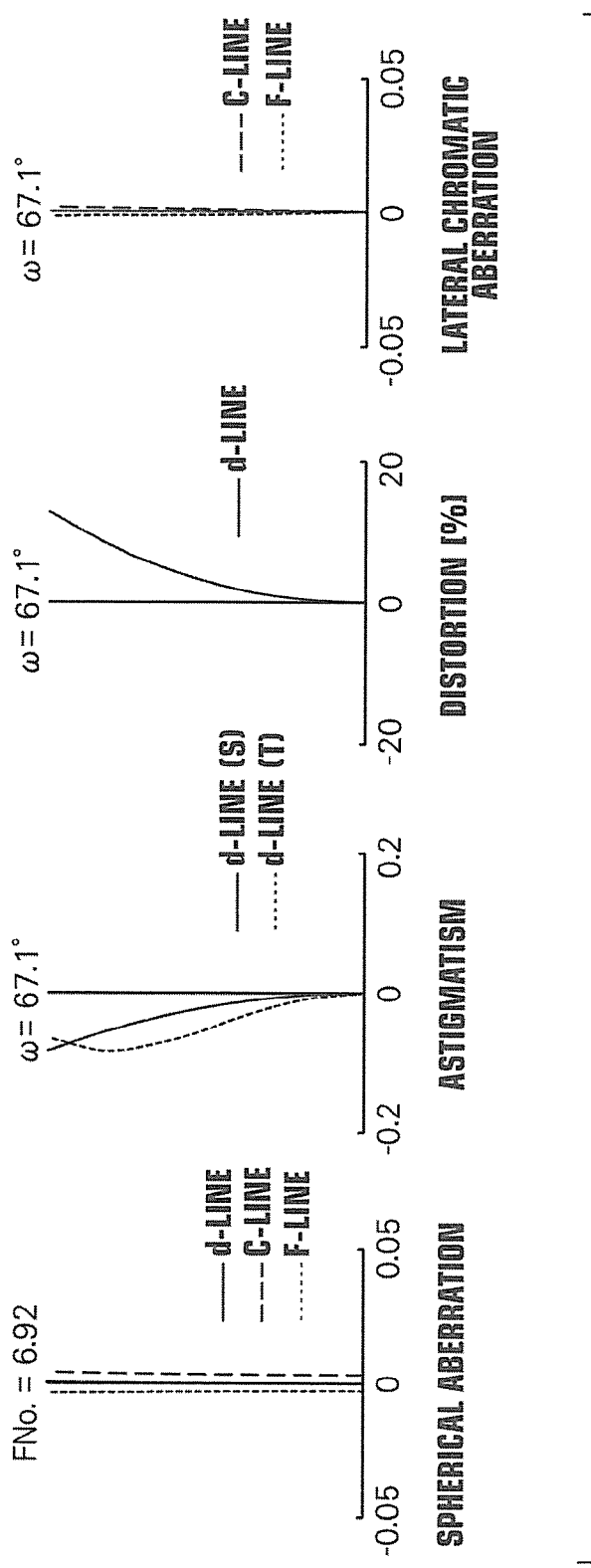
FIG. 14 shows aberration diagrams of the endoscope objective lens of Example 4 of the disclosure, showing spherical aberration, astigmatism, distortion, and lateral chromatic aberration in this order from the left side of the drawing.

The lens configuration of the endoscope objective lens of Example 4 is shown in FIG. 4. Tables 8 and 9 show basic lens data and specifications of the endoscope objective lens of Example 4, respectively. FIG. 14 shows aberration diagrams of the endoscope objective lens of Example 4. The values of the basic lens data and the aberration diagrams of Example 4 are those when the object distance is 9.84.

TABLE 8

Example 4 - Lens Data

| Si | Ri | Di | Ndj | vdj |
|---|---|---|---|---|
| 1 | 4.6027 | 0.2869 | 1.88300 | 40.81 |
| 2 | 0.4892 | 0.2926 | | |
| 3 | 3.2540 | 0.2870 | 1.69701 | 30.21 |
| 4 | −0.8198 | 0.2624 | 1.82138 | 45.86 |
| 5 | −1.3305 | 0.0000 | | |
| 6(St) | ∞ | 0.0369 | | |
| 7 | −3.7790 | 0.6969 | 1.79463 | 25.27 |
| 8 | −1.3014 | 0.0820 | | |
| 9 | 5.6792 | 0.2869 | 1.92001 | 19.00 |
| 10 | 0.9710 | 0.4919 | 1.62136 | 61.33 |
| 11 | −1.6808 | 0.2502 | | |
| 12 | ∞ | 2.7055 | 1.55920 | 53.92 |
| 13 | ∞ | 0.0000 | | |

TABLE 9

Example 4 - Specifications

| | |
|---|---|
| f | 1.00 |
| Bf | 1.89 |
| FNo. | 6.92 |
| 2ω[°] | 134.2 |

Example 5

Figure 15:
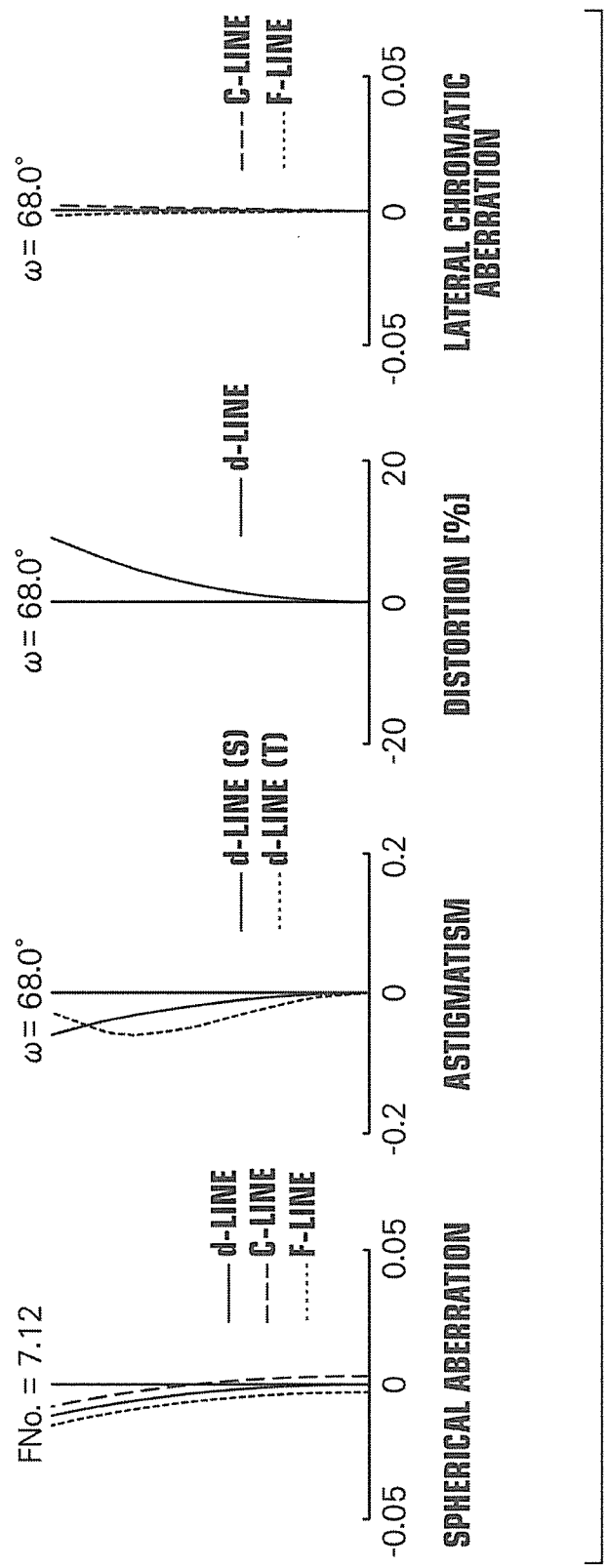
FIG. 15 shows aberration diagrams of the endoscope objective lens of Example 5 of the disclosure, showing spherical aberration, astigmatism, distortion, and lateral chromatic aberration in this order from the left side of the drawing.

The lens configuration of the endoscope objective lens of Example 5 is shown in FIG. 5. Tables 10 and 11 show basic lens data and specifications of the endoscope objective lens of Example 5, respectively. FIG. 15 shows aberration diagrams of the endoscope objective lens of Example 5. The values of the basic lens data and the aberration diagrams of Example 5 are those when the object distance is 9.59.

TABLE 10

Example 5 - Lens Data

| Si | Ri | Di | Ndj | vdj |
|---|---|---|---|---|
| 1 | 4.4883 | 0.2798 | 1.88300 | 40.81 |
| 2 | 0.4899 | 0.2878 | | |
| 3 | −15.9925 | 0.1615 | 1.67199 | 32.00 |
| 4 | −1.3325 | 0.2798 | 1.73001 | 55.00 |
| 5 | −7.9174 | 0.0000 | | |
| 6(St) | ∞ | 0.0360 | | |
| 7 | 1.5274 | 0.9594 | 1.62406 | 35.59 |
| 8 | −1.0265 | 0.0799 | | |
| 9 | 3.8428 | 0.5996 | 1.54117 | 73.67 |
| 10 | −0.6883 | 0.2798 | 1.92001 | 20.71 |
| 11 | −1.6840 | 0.3027 | | |
| 12 | ∞ | 2.6383 | 1.55920 | 53.92 |
| 13 | ∞ | 0.0000 | | |

TABLE 11

Example 5 - Specifications

| | |
|---|---|
| f | 1.00 |
| Bf | 1.89 |
| FNo. | 7.12 |
| 2ω[°] | 136.0 |

Example 6

Figure 16:
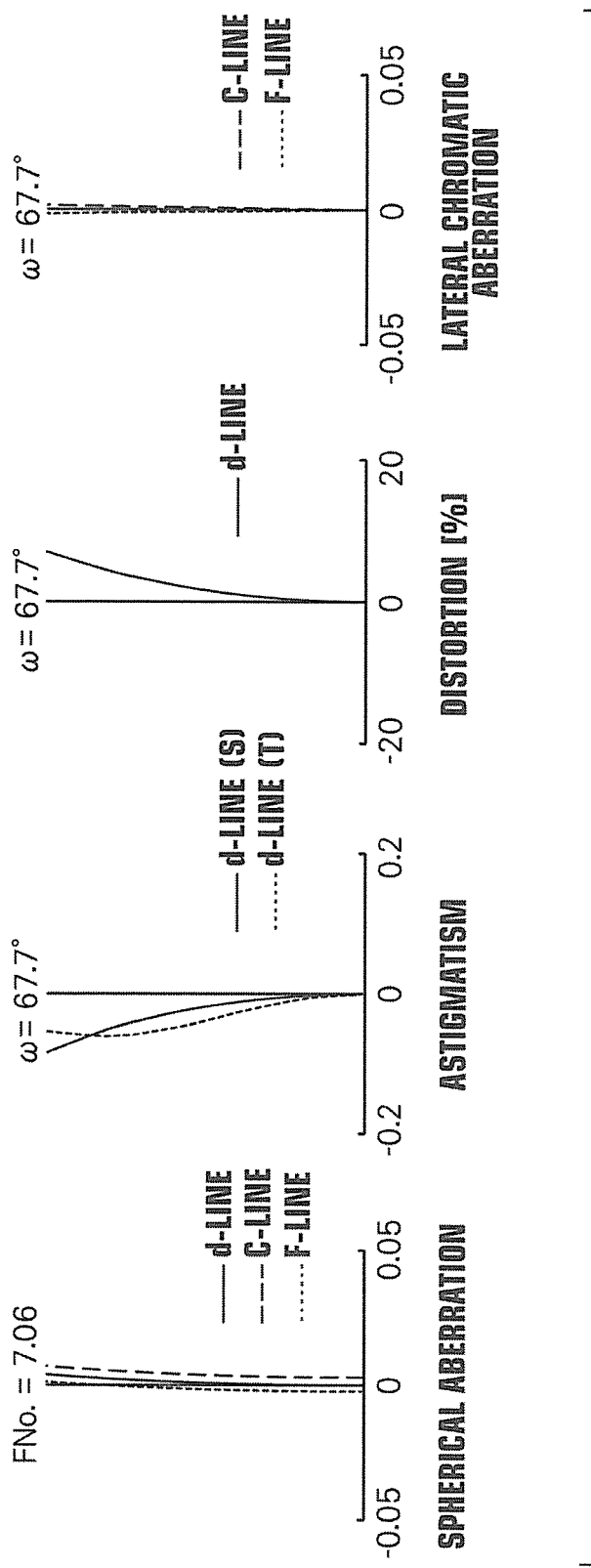
FIG. 16 shows aberration diagrams of the endoscope objective lens of Example 6 of the disclosure, showing spherical aberration, astigmatism, distortion, and lateral chromatic aberration in this order from the left side of the drawing.

The lens configuration of the endoscope objective lens of Example 6 is shown in FIG. 6. Tables 12, 13, and 14 show basic lens data, specifications, and aspheric coefficients of the endoscope objective lens of Example 6, respectively. FIG. 16 shows aberration diagrams of the endoscope objective lens of Example 6. The values of the basic lens data and the aberration diagrams of Example 6 are those when the object distance is 9.41.

TABLE 12

Example 6 - Lens Data

| Si | Ri | Di | Ndj | vdj |
|---|---|---|---|---|
| 1 | 4.4066 | 0.2747 | 1.88300 | 40.80 |
| 2 | 0.4868 | 0.2801 | | |
| *3 | 2.4816 | 0.2258 | 1.67199 | 32.00 |
| 4 | −1.3082 | 0.2747 | 1.92001 | 36.00 |
| 5 | −29.4530 | 0.0000 | | |
| 6(St) | ∞ | 0.0353 | | |
| 7 | 2.9022 | 0.7849 | 1.70743 | 29.63 |
| 8 | −0.9992 | 0.0785 | | |
| 9 | 3.9004 | 0.5887 | 1.58694 | 66.62 |
| 10 | −0.6984 | 0.2747 | 1.91864 | 19.07 |
| 11 | −1.8625 | 0.2967 | | |
| 12 | ∞ | 2.5903 | 1.55920 | 53.90 |
| 13 | ∞ | 0.0000 | | |

TABLE 13

Example 6 - Specifications

| | |
|---|---|
| f | 1.00 |
| Bf | 1.85 |
| FNo. | 7.06 |
| 2ω[°] | 135.4 |

TABLE 14

Example 6 - Aspheric Coefficients

| Surface No. | 3 |
|---|---|
| KA | 1.0000000E+00 |
| A3 | 0.0000000E+00 |
| A4 | −2.5648987E−02 |
| A5 | 0.0000000E+00 |
| A6 | −9.8764748E−01 |
| A7 | 0.0000000E+00 |
| A8 | 2.5406868E+00 |
| A9 | 0.0000000E+00 |
| A10 | −2.7398181E+00 |

Example 7

Figure 17:
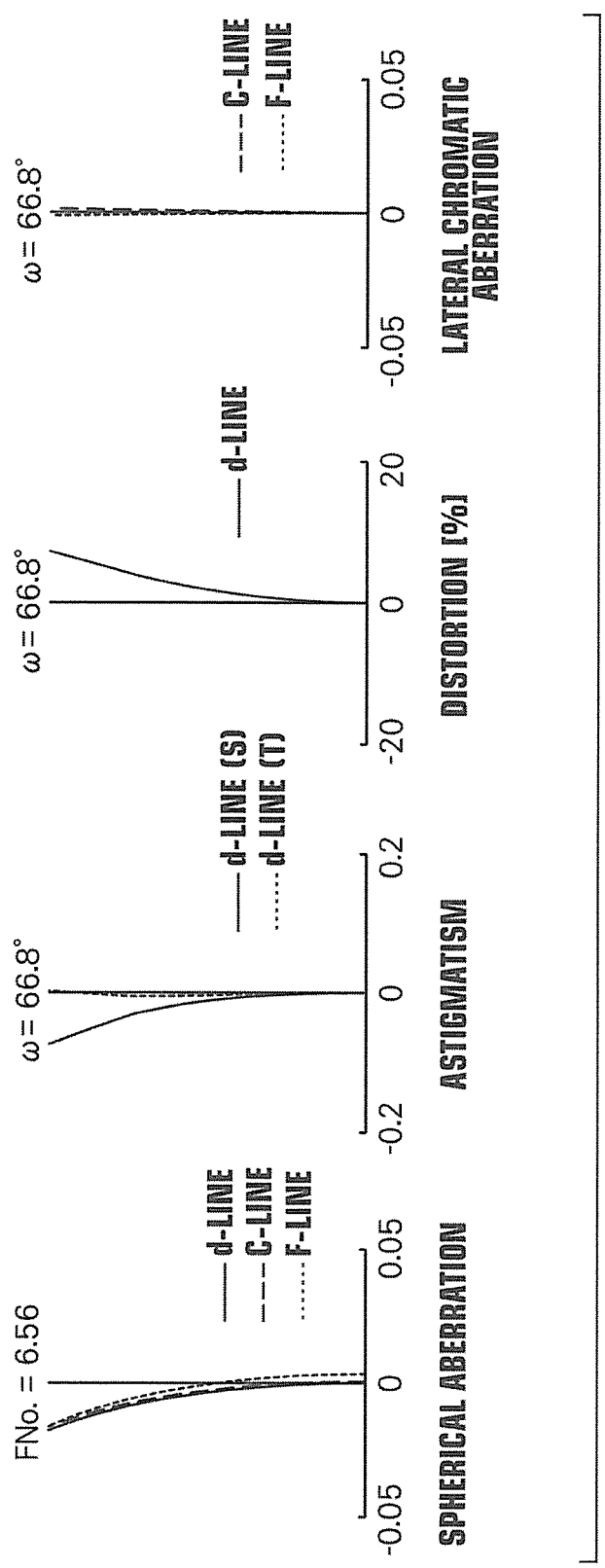
FIG. 17 shows aberration diagrams of the endoscope objective lens of Example 7 of the disclosure, showing spherical aberration, astigmatism, distortion, and lateral chromatic aberration in this order from the left side of the drawing.

The lens configuration of the endoscope objective lens of Example 7 is shown in FIG. 7. Tables 15 and 16 show basic lens data and specifications of the endoscope objective lens of Example 7, respectively. FIG. 17 shows aberration diagrams of the endoscope objective lens of Example 7. The values of the basic lens data and the aberration diagrams of Example 7 are those when the object distance is 9.39.

TABLE 15

Example 7 - Lens Data

| Si | Ri | Di | Ndj | vdj |
|---|---|---|---|---|
| 1 | 4.3917 | 0.2738 | 1.89024 | 38.98 |
| 2 | 0.4331 | 0.2347 | | |
| 3 | 1.1578 | 0.2738 | 1.68000 | 31.43 |
| 4 | −0.4346 | 0.4694 | 1.89647 | 38.35 |
| 5 | −0.7689 | 0.0000 | | |
| 6(St) | ∞ | 0.0275 | | |
| 7 | 19.9091 | 0.8665 | 1.59244 | 65.78 |
| 8 | −0.5587 | 0.0235 | | |
| 9 | −0.5493 | 0.2738 | 2.00001 | 16.37 |
| 10 | −1.0852 | 0.3048 | | |
| 11 | ∞ | 2.5815 | 1.78800 | 47.37 |
| 12 | ∞ | 0.0000 | | |

TABLE 16

Example 7 - Specifications

| | |
|---|---|
| f | 1.00 |
| Bf | 1.64 |
| FNo. | 6.56 |
| 2ω[°] | 133.6 |

Example 8

Figure 18:
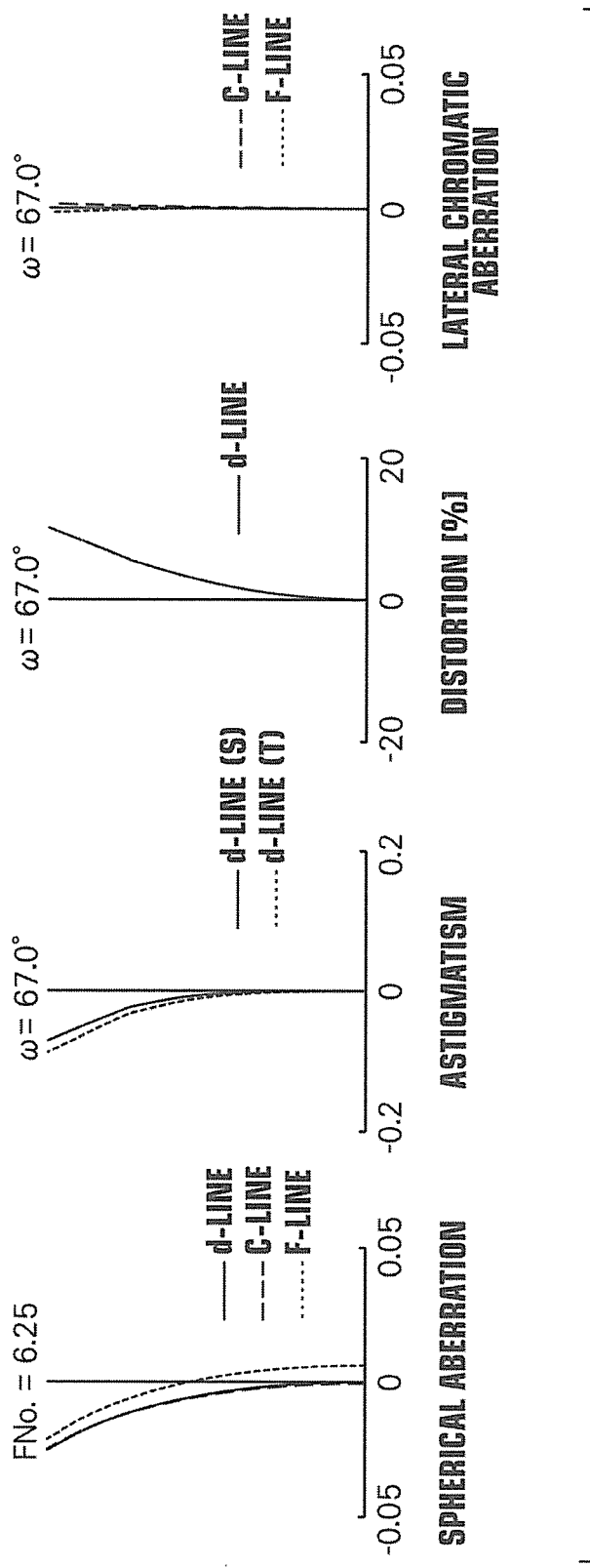
FIG. 18 shows aberration diagrams of the endoscope objective lens of Example 8 of the disclosure, showing spherical aberration, astigmatism, distortion, and lateral chromatic aberration in this order from the left side of the drawing.

The lens configuration of the endoscope objective lens of Example 8 is shown in FIG. 8. Tables 17 and 18 show basic lens data and specifications of the endoscope objective lens of Example 8, respectively. FIG. 18 shows aberration diagrams of the endoscope objective lens of Example 8. The values of the basic lens data and the aberration diagrams of Example 8 are those when the object distance is 9.64.

TABLE 17

Example 8 - Lens Data

| Si | Ri | Di | Ndj | vdj |
|---|---|---|---|---|
| 1 | 4.5090 | 0.2811 | 1.99001 | 29.00 |
| 2 | 0.4100 | 0.2410 | | |
| 3 | 1.4826 | 0.4819 | 2.05994 | 12.00 |
| 4 | 1.7421 | 0.2651 | 1.70999 | 29.50 |
| 5 | −0.6882 | 0.0000 | | |
| 6(St) | ∞ | 0.0281 | | |
| 7 | −11.8877 | 0.8835 | 1.63959 | 59.52 |
| 8 | −0.5199 | 0.0241 | | |
| 9 | −0.5013 | 0.2811 | 1.99001 | 20.70 |
| 10 | −1.0313 | 0.3102 | | |
| 11 | ∞ | 2.6505 | 1.78800 | 47.37 |
| 12 | ∞ | 0.0000 | | |

TABLE 18

Example 8 - Specifications

| | |
|---|---|
| f | 1.00 |
| Bf | 1.69 |
| FNo. | 6.25 |
| 2ω[°] | 134.0 |

Example 9

Figure 19:
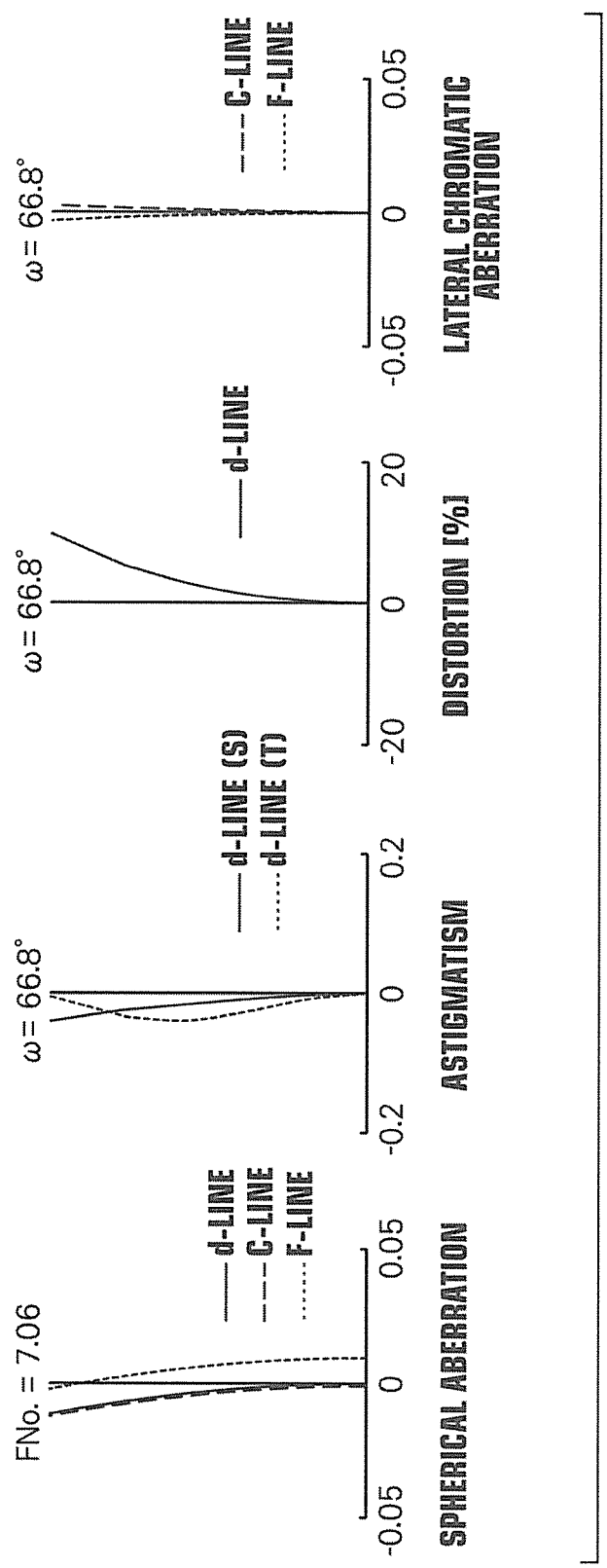
FIG. 19 shows aberration diagrams of the endoscope objective lens of Example 9 of the disclosure, showing spherical aberration, astigmatism, distortion, and lateral chromatic aberration in this order from the left side of the drawing.

The lens configuration of the endoscope objective lens of Example 9 is shown in FIG. 9. Tables 19, 20, and 21 show basic lens data, specifications, and aspheric coefficients of the endoscope objective lens of Example 9, respectively. FIG. 19 shows aberration diagrams of the endoscope objective lens of Example 9. The values of the basic lens data and the aberration diagrams of Example 9 are those when the object distance is 9.49.

TABLE 19

Example 9 - Lens Data

| Si | Ri | Di | Ndj | vdj |
|---|---|---|---|---|
| 1 | 4.4748 | 0.2790 | 1.88300 | 40.81 |
| 2 | 0.6202 | 0.8967 | | |
| 3(St) | ∞ | 0.0279 | | |
| 4 | 1.9159 | 1.1159 | 1.75879 | 27.06 |
| 5 | −1.2652 | 0.0957 | | |
| *6 | 6.5869 | 0.2790 | 1.72298 | 55.35 |
| 7 | −0.7814 | 0.2790 | 1.92001 | 19.00 |
| 8 | −6.9510 | 0.3042 | | |
| 9 | ∞ | 2.6303 | 1.55920 | 53.92 |
| 10 | ∞ | 0.0000 | | |

TABLE 20

Example 9 - Specifications

| | |
|---|---|
| f | 1.00 |
| Bf | 1.89 |
| FNo. | 7.06 |
| 2ω[°] | 133.6 |

TABLE 21

Example 9 - Aspheric Coefficients

| Surface No. | 6 |
|---|---|
| KA | 1.0000000E+00 |
| A3 | 0.0000000E+00 |
| A4 | −4.3405277E−02 |
| A5 | 0.0000000E+00 |
| A6 | −1.4204588E−01 |
| A7 | 0.0000000E+00 |
| A8 | 6.3324140E−02 |

Example 10

Figure 20:
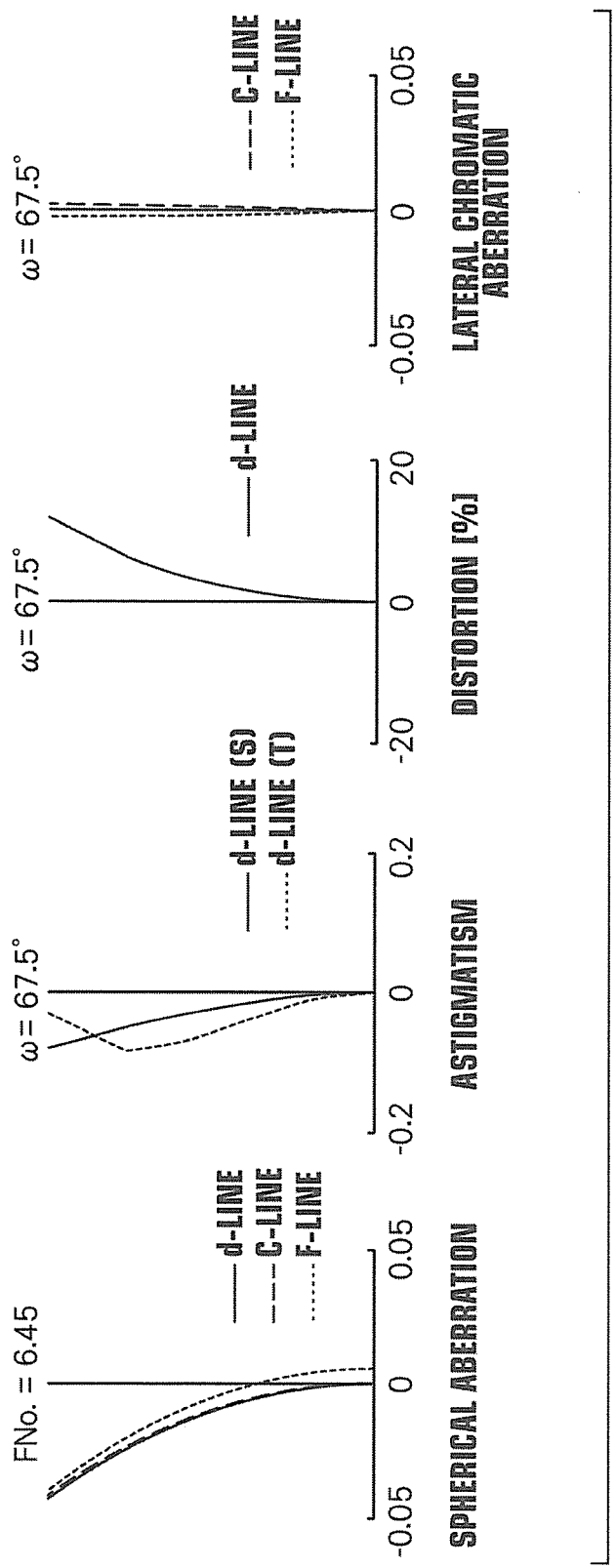
FIG. 20 shows aberration diagrams of the endoscope objective lens of Example 10 of the disclosure, showing spherical aberration, astigmatism, distortion, and lateral chromatic aberration in this order from the left side of the drawing.

The lens configuration of the endoscope objective lens of Example 10 is shown in FIG. 10. Tables 22 and 23 show basic lens data and specifications of the endoscope objective lens of Example 10, respectively. FIG. 20 shows aberration diagrams of the endoscope objective lens of Example 10. The values of the basic lens data and the aberration diagrams of Example 10 are those when the object distance is 9.78.

TABLE 22

Example 10 - Lens Data

| Si | Ri | Di | Ndj | vdj |
|---|---|---|---|---|
| 1 | 4.5768 | 0.2853 | 1.88300 | 40.81 |
| 2 | 0.6864 | 0.9035 | | |
| 3(St) | ∞ | 0.0285 | | |

TABLE 22-continued

Example 10 - Lens Data

| Si | Ri | Di | Ndj | vdj |
|---|---|---|---|---|
| 4 | 3.9089 | 0.9197 | 1.79070 | 25.46 |
| 5 | −1.2941 | 0.0978 | | |
| 6 | 8.3308 | 0.3424 | 1.92001 | 19.00 |
| 7 | 0.9090 | 0.2853 | 1.71451 | 55.77 |
| 8 | −2.9408 | 0.3318 | | |
| 9 | ∞ | 2.6903 | 1.55920 | 53.92 |
| 10 | ∞ | 0.0000 | | |

TABLE 23

Example 10 - Specifications

| | |
|---|---|
| f | 1.00 |
| Bf | 1.96 |
| FNo. | 6.45 |
| 2ω[°] | 135.0 |

Table 24 shows values corresponding to and relating to the condition expressions (1) to (7) of Examples 1 to 10. The data shown in Table 24 are with respect to the d-line.

TABLE 24

| No | | Example 1 | Example 2 | Example 3 | Example 4 | Example 5 |
|---|---|---|---|---|---|---|
| (1) | $1.0 < f/(Dp-Dc) < 10$ | 3.1092 | 6.7666 | 3.3863 | 6.7787 | 1.9300 |
| (2) | $Lf \times Lr/f^2 < 5.0$ | 1.9985 | 1.9845 | 1.9989 | 1.8007 | 1.9724 |
| (3) | $1.6 < Dp/Dcp - \dfrac{(1/Rpf - 1/Rpr)}{(1/Rcpf - 1/Rcpr)}$ | 2.6749 | 2.3494 | 2.5718 | 2.0983 | 3.5728 |
| (4) | $TL/f < 4.0$ | 2.9140 | 2.8857 | 2.9149 | 2.7239 | 2.9639 |
| (5) | $Nd1p < 1.72$ | 1.68893 | 1.68822 | 1.68416 | 1.69701 | 1.67199 |
| (6) | $vd1p < 35$ | 30.79 | 30.84 | 31.13 | 30.21 | 32.00 |
| (7) | $50 < vd2p$ | 66.99 | 57.25 | 66.25 | 61.33 | 73.67 |
| | f | 1.00 | 1.00 | 1.00 | 1.00 | 1.00 |
| | Dp | 0.8590 | 0.6982 | 0.8323 | 0.6969 | 0.9594 |
| | Dc | 0.5374 | 0.5504 | 0.5370 | 0.5494 | 0.4413 |
| | Lf | 1.1043 | 1.1310 | 1.1035 | 1.1289 | 1.0089 |
| | Lr | 1.8095 | 1.7550 | 1.8113 | 1.5946 | 1.9547 |
| | Rpf | ∞ | −3.8029 | ∞ | −3.7790 | 1.5274 |
| | Rpr | −0.8970 | −0.9771 | −0.8854 | −1.3014 | −1.0265 |
| | Rcpf | 0.8021 | 0.5476 | 0.8015 | 3.2540 | −15.9925 |
| | Rcpr | −2.4179 | −1.5234 | −2.3234 | −0.8198 | −1.3325 |
| | Dcp | 0.2567 | 0.2629 | 0.2565 | 0.2870 | 0.1615 |
| | TL | 2.9138 | 2.8860 | 2.9148 | 2.7235 | 2.9636 |

| No | | Example 6 | Example 7 | Example 8 | Example 9 | Example 10 |
|---|---|---|---|---|---|---|
| (1) | $1.0 < f/(Dp-Dc) < 10$ | 3.5162 | 8.1092 | 7.3263 | 1.7925 | 3.4249 |
| (2) | $Lf \times Lr/f^2 < 5.0$ | 1.8595 | 1.4916 | 1.5441 | 2.1132 | 1.9894 |
| (3) | $1.6 < Dp/Dcp - \dfrac{(1/Rpf - 1/Rpr)}{(1/Rcpf - 1/Rcpr)}$ | 2.3236 | 2.5833 | 2.4253 | 3.0829 | 2.5094 |
| (4) | $TL/f < 4.0$ | 2.8174 | 2.4434 | 2.4858 | 2.9731 | 2.8623 |
| (5) | $Nd1p < 1.72$ | 1.67199 | 1.68000 | 1.70999 | — | — |
| (6) | $vd1p < 35$ | 32.00 | 31.43 | 29.50 | — | — |
| (7) | $50 < vd2p$ | 66.62 | — | — | 55.35 | 55.77 |
| | f | 1.00 | 1.00 | 1.00 | 1.00 | 1.00 |
| | Dp | 0.7849 | 0.8665 | 0.8835 | 1.1159 | 0.9197 |
| | Dc | 0.5005 | 0.7432 | 0.7470 | 0.5580 | 0.6277 |
| | Lf | 1.0553 | 1.2517 | 1.2691 | 1.1757 | 1.1888 |
| | Lr | 1.7621 | 1.1913 | 1.2168 | 1.7975 | 1.6737 |
| | Rpf | 2.9022 | 19.9091 | −11.8877 | 1.9159 | 3.9089 |
| | Rpr | −0.9992 | −0.5587 | −0.5199 | −1.2652 | −1.2941 |
| | Rcpf | 2.4816 | 1.1578 | 1.7421 | 6.5869 | 0.9090 |
| | Rcpr | −1.3082 | −0.4346 | −0.6882 | −0.7814 | −2.9408 |
| | Dcp | 0.2258 | 0.2738 | 0.2651 | 0.2790 | 0.2853 |
| | TL | 2.8174 | 2.4430 | 2.4859 | 2.9732 | 2.8625 |

Figure 21:
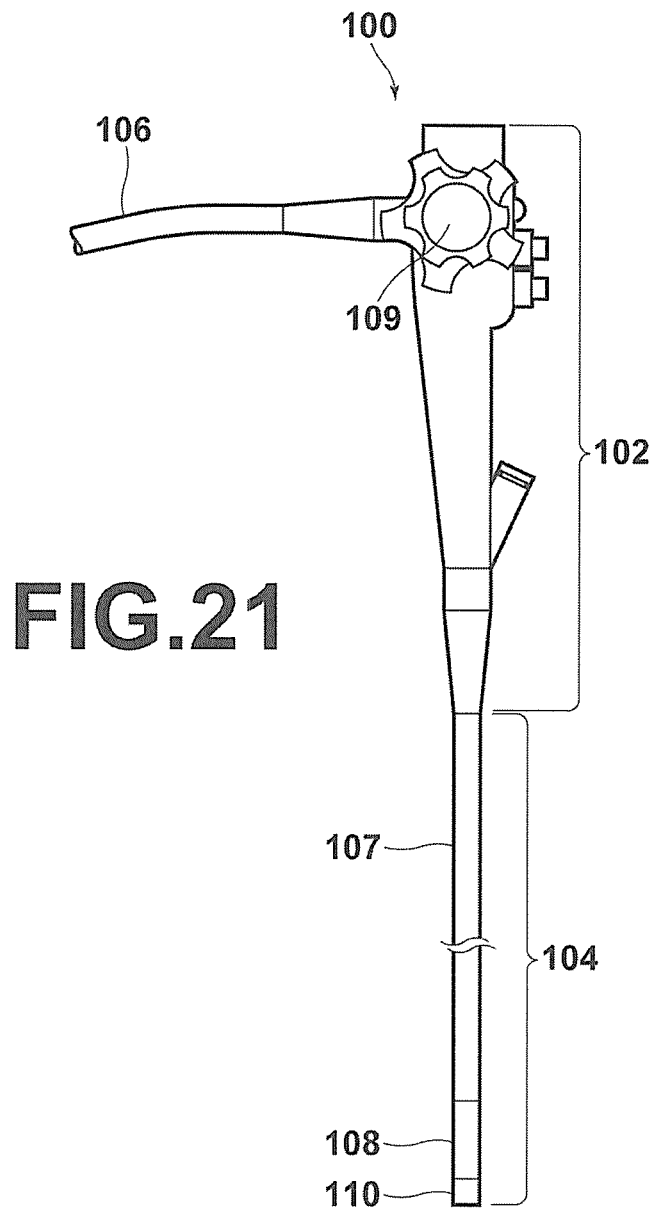
FIG. 21 is a diagram illustrating the schematic configuration of an endoscope according to an embodiment of the disclosure.

Next, an embodiment of an endoscope to which the endoscope objective lens of the disclosure is applied is described with reference to FIGS. 21 to 23. FIG. 21 shows the schematic configuration of the entire endoscope. An endoscope 100 shown in FIG. 21 primarily includes an operating section 102, an inserted section 104, and a universal cord 106 connected to a connector section (not shown). Most part of the inserted section 104 is formed by a soft portion 107, which can bend in any direction along an insertion path. A bending section 108 is coupled to the distal end of the soft portion 107, and a distal end portion 110 is coupled to the distal end of the bending section 108. The bending section 108 is provided to orient the distal end portion 110 in a desired direction, and bending operation can be achieved by rotating a bending operation knob 109 provided at the operating section 102.

Figure 22:
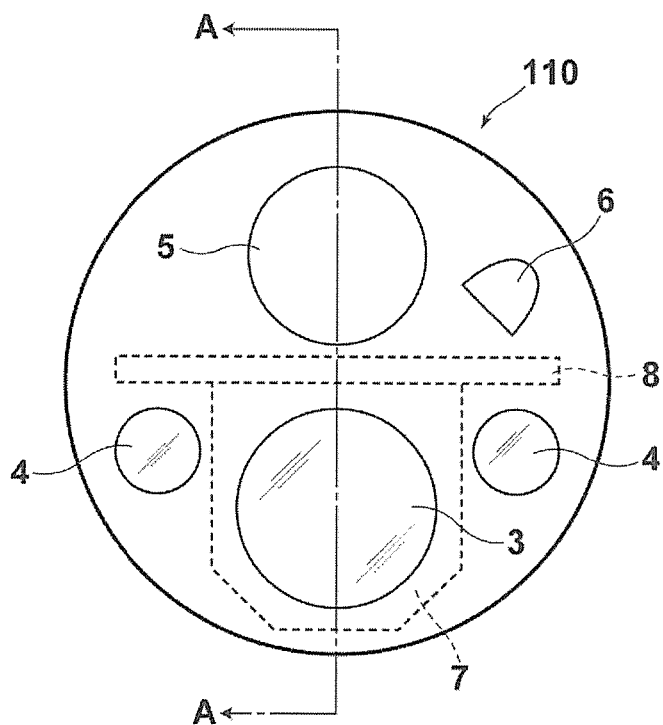
FIG. 22 is a plan view of a distal end surface of an inserted section of the endoscope according to the embodiment of the disclosure.

FIG. 22 shows a plan view of the distal end of the distal end portion 110 along a plane perpendicular to the longitudinal direction of the inserted section 104. At the distal end surface of the distal end portion 110, an observation window 3, which is the outer surface of the endoscope objective lens 1, two illumination windows 4 which are disposed on the both sides of the observation window 3 and through which illumination light is applied, a surgical tool insertion opening 5, and an air/water delivering nozzle 6 are disposed.

Figure 23:
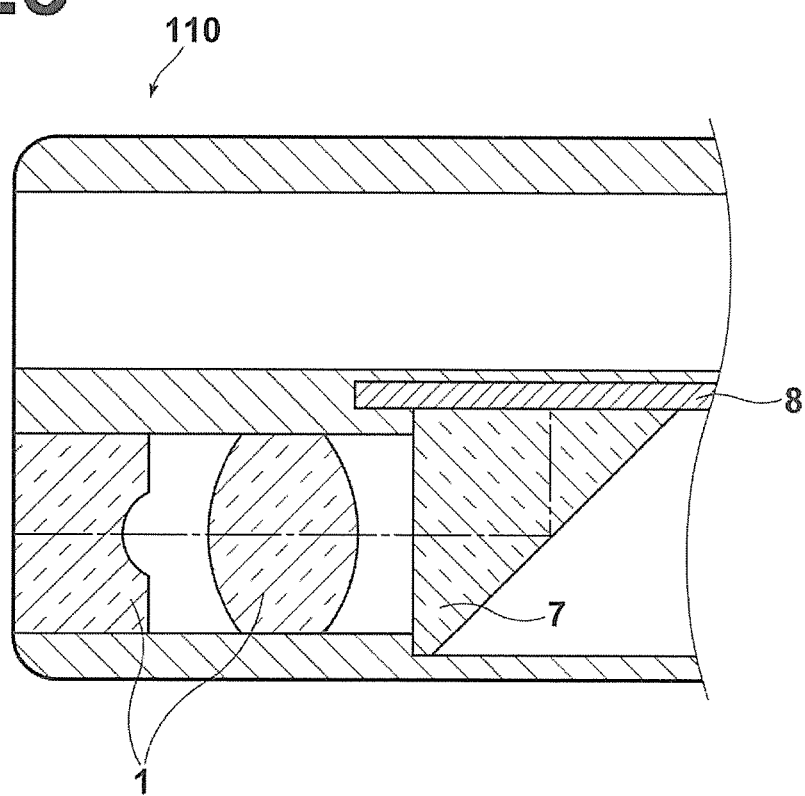
FIG. 23 is a sectional view showing the substantial part of the distal end surface of the endoscope according to the embodiment of the disclosure.

FIG. 23 is a sectional view of a substantial part of the distal end portion 110 taken along line A-A shown in FIG. 22. In the interior of the distal end portion 110, the endoscope objective lens 1 whose optical axis is positioned in parallel with the longitudinal direction of the inserted section 104, an optical path changing prism 7 for bending the optical path on the image side of the endoscope objective lens 1 by about an angle of 90 degrees, and a solid-state image sensor 8 which is coupled to the optical path changing prism 7 such that the light-receiving surface of the solid-state image sensor 8 is in parallel with the longitudinal direction of the inserted section 104 are disposed. It should be noted that the endoscope objective lens 1 is conceptually shown in FIG. 23, and the optical axis of the observation optical system formed by the endoscope objective lens 1 is shown in the long-and-short dashed line. The solid-state image sensor 8 is disposed such that the imaging surface thereof is in the same position as the image plane of the endoscope objective lens 1. An optical image formed by the endoscope objective lens 1 is captured by the solid-state image sensor 8 and is converted into an electric signal.

The present disclosure has been described with reference to the embodiments and the examples. However, the disclosure is not limited to the above-described embodiments and examples, and various modifications may be made to the disclosure. For example, the values of the radius of curvature, the surface distance, the refractive index, the Abbe number, the aspheric coefficients, etc., of each lens are not limited to the values shown in the above-described examples and may take different values.

What is claimed is:

1. An endoscope objective lens consisting of, in order from an object side, a first lens group having a negative refractive power, a stop, and a second lens group having a positive refractive power,
    wherein at least one of the first lens group and the second lens group comprises only one cemented lens which is formed by a positive lens and a negative lens cemented together,
    the entire system comprises at least one single lens having a positive refractive power, and the condition expressions (1) and (2) below are satisfied:

$$1.0 < f/(Dp-Dc) < 10 \quad (1), \text{ and}$$

$$Lf \times Lr/f^2 < 5.0 \quad (2),$$

where f is a focal length of the entire system, Dp is a center thickness of a lens with the smallest center thickness among the at least one single lens having a positive refractive power, Dc is a center thickness of a cemented lens with the smallest center thickness among the at least one cemented lens, Lf is a distance along an optical axis from the most object-side lens surface to the stop, and Lr is a distance along the optical axis from the stop to the most image-side lens surface.

2. The endoscope objective lens as claimed in claim 1, wherein the condition expression (3) below is satisfied:

$$1.6 < \frac{Dp}{Dcp} \cdot \frac{\left(\frac{1}{Rpf} - \frac{1}{Rpr}\right)}{\left(\frac{1}{Rcpf} - \frac{1}{Rcpr}\right)}, \quad (3)$$

where Dp is a center thickness of the lens with the smallest center thickness among the at least one single lens having a positive refractive power, Dcp is a center thickness of the positive lens forming the cemented lens with the smallest center thickness among the at least one cemented lens, Rpf is a paraxial radius of curvature of the object-side surface of the lens with the smallest center thickness among the at least one single lens having a positive refractive power, Rpr is a paraxial radius of curvature of the image-side surface of the lens with the smallest center thickness among the at least one single lens having a positive refractive power, Rcpf is a paraxial radius of curvature of the object-side surface of the positive lens forming the cemented lens with the smallest center thickness among the at least one cemented lens, and Rcpr is a paraxial radius of curvature of the image-side surface of the positive lens forming the cemented lens with the smallest center thickness among the at least one cemented lens.

3. The endoscope objective lens as claimed in claim 1, wherein both the first lens group and the second lens group comprise the cemented lens.

4. The endoscope objective lens as claimed in claim 1, wherein only the first lens group comprises the cemented lens.

5. The endoscope objective lens as claimed in claim 1, wherein only the second lens group comprises the cemented lens.

6. The endoscope objective lens as claimed in claim 1, wherein
    the first lens group consists of, in order from the object side, a single lens having a negative refractive power, and a cemented lens formed by two lenses cemented together where one of the two lenses is a positive lens and the other is a negative lens, and
    the second lens group consists of, in order from the object side, a single lens having a positive refractive power, and a cemented lens formed by two lenses cemented together where one of the two lenses is a positive lens and the other is a negative lens.

7. The endoscope objective lens as claimed in claim 1, wherein
    the first lens group consists of, in order from the object side, a single lens having a negative refractive power, and a cemented lens formed by two lenses cemented together where one of the two lenses is a positive lens and the other is a negative lens, and the second lens group consists of, in order from the object side, a single lens having a positive refractive power, and a single lens having a negative refractive power.

8. The endoscope objective lens as claimed in claim 1, wherein the first lens group consists of a single lens having a negative refractive power, and the second lens group consists of, in order from the object side, a single lens having a positive refractive power, and a cemented lens formed by two lenses cemented together where one of the two lenses is a positive lens and the other is a negative lens.

9. The endoscope objective lens as claimed in claim 1, wherein the condition expression (4) below is satisfied:

$$TL/f < 4.0 \quad (4),$$

where TL is a distance along the optical axis from the most object-side lens surface to the most image-side lens surface, and f is a focal length of the entire system.

10. The endoscope objective lens as claimed in claim 1, wherein the condition expressions (5) and (6) below are satisfied:

$$Nd1p < 1.72 \quad (5), \text{ and}$$

$$vd1p < 35 \quad (6),$$

where Nd1p is a refractive index with respect to the d-line of the positive lens forming the cemented lens of the first lens group, and vd1p is an Abbe number with respect to the d-line of the positive lens forming the cemented lens of the first lens group.

11. The endoscope objective lens as claimed in claim 1, wherein the condition expression (7) below is satisfied:

$$50 < vd2p \quad (7),$$

where vd2p is an Abbe number with respect to the d-line of the positive lens forming the cemented lens of the second lens group.

12. An endoscope objective lens consisting of, in order from an object side, a first lens group having a negative refractive power, a stop, and a second lens group having a positive refractive power, wherein at least one of the first lens group and the second lens group comprises only one cemented lens which is formed by a positive lens and a negative lens cemented together, the entire system comprises at least one single lens having a positive refractive power, and the condition expression (3) below is satisfied:

$$1.6 < \frac{Dp}{Dcp} - \frac{\left(\frac{1}{Rpf} - \frac{1}{Rpr}\right)}{\left(\frac{1}{Rcpf} - \frac{1}{Rcpr}\right)}, \quad (3)$$

where Dp is a center thickness of a lens with the smallest center thickness among the at least one single lens having a positive refractive power, Dcp is a center thickness of the positive lens forming a cemented lens with the smallest center thickness among the at least one cemented lens, Rpf is a paraxial radius of curvature of the object-side surface of the lens with the smallest center thickness among the at least one single lens having a positive refractive power, Rpr is a paraxial radius of curvature of the image-side surface of the lens with the smallest center thickness among the at least one single lens having a positive refractive power, Rcpf is a paraxial radius of curvature of the object-side surface of the positive lens forming the cemented lens with the smallest center thickness among the at least one cemented lens, and Rcpr is a paraxial radius of curvature of the image-side surface of the positive lens forming the cemented lens with the smallest center thickness among the at least one cemented lens.

13. The endoscope objective lens as claimed in claim 12, wherein the condition expression (2) below is satisfied:

$$Lf \times Lr/f^2 < 5.0 \quad (2),$$

where f is a focal length of the entire system, Lf is a distance along an optical axis from the most object-side lens surface to the stop, and Lr is a distance along the optical axis from the stop to the most image-side lens surface.

14. The endoscope objective lens as claimed in claim 12, wherein the first lens group consists of, in order from the object side, a single lens having a negative refractive power, and a cemented lens formed by two lenses cemented together where one of the two lenses is a positive lens and the other is a negative lens, and the second lens group consists of, in order from the object side, a single lens having a positive refractive power, and a cemented lens formed by two lenses cemented together where one of the two lenses is a positive lens and the other is a negative lens.

15. The endoscope objective lens as claimed in claim 12, wherein the first lens group consists of, in order from the object side, a single lens having a negative refractive power, and a cemented lens formed by two lenses cemented together where one of the two lenses is a positive lens and the other is a negative lens, and the second lens group consists of, in order from the object side, a single lens having a positive refractive power, and a single lens having a negative refractive power.

16. The endoscope objective lens as claimed in claim 12, wherein the first lens group consists of a single lens having a negative refractive power, and the second lens group consists of, in order from the object side, a single lens having a positive refractive power, and a cemented lens formed by two lenses cemented together where one of the two lenses is a positive lens and the other is a negative lens.

17. The endoscope objective lens as claimed in claim 12, wherein the condition expression (4) below is satisfied:

$$TL/f < 4.0 \quad (4),$$

where TL is a distance along the optical axis from the most object-side lens surface to the most image-side lens surface, and f is a focal length of the entire system.

18. The endoscope objective lens as claimed in claim 12, wherein the condition expressions (5) and (6) below are satisfied:

$$Nd1p < 1.72 \quad (5), \text{ and}$$

$$vd1p < 35 \quad (6),$$

where Nd1p is a refractive index with respect to the d-line of the positive lens forming the cemented lens of the first lens group, and vd1p is an Abbe number with respect to the d-line of the positive lens forming the cemented lens of the first lens group.

19. An endoscope comprising the endoscope objective lens as claimed in claim 1.

20. An endoscope comprising the endoscope objective lens as claimed in claim 12.

* * * * *